(12) United States Patent
Watkins

(10) Patent No.: US 7,327,045 B2
(45) Date of Patent: Feb. 5, 2008

(54) FUEL DELIVERY SYSTEM AND METHOD PROVIDING REGULATED ELECTRICAL OUTPUT

(76) Inventor: Owen Watkins, 103 Iron Horse La., East Fallowfield, PA (US) 19320

( * ) Notice: Subject to any disclaimer, the term of this patent is extended or adjusted under 35 U.S.C. 154(b) by 55 days.

(21) Appl. No.: 11/124,720

(22) Filed: May 9, 2005

(65) Prior Publication Data

US 2005/0254960 A1    Nov. 17, 2005

Related U.S. Application Data

(60) Provisional application No. 60/570,243, filed on May 12, 2004.

(51) Int. Cl.
| F02B 63/04 | (2006.01) |
| H02K 7/18 | (2006.01) |
| F03G 7/08 | (2006.01) |

(52) U.S. Cl. ............................ 290/1 R; 290/1 A; 137/8
(58) Field of Classification Search ................ 290/1 A, 290/1 R; 137/8
See application file for complete search history.

(56) References Cited

U.S. PATENT DOCUMENTS

| 3,279,496 | A | * | 10/1966 | Klass et al. ............... 137/487.5 |
| 3,546,474 | A | * | 12/1970 | De Courcy et al. ........... 290/52 |
| 3,564,919 | A | * | 2/1971 | Varga ........................... 73/258 |
| 3,720,106 | A | * | 3/1973 | Varga ........................... 73/273 |
| 3,835,706 | A | * | 9/1974 | Varga ........................... 73/254 |
| 3,981,618 | A |  | 9/1976 | Nelson ......................... 417/12 |
| 4,010,767 | A | * | 3/1977 | Cornell ................... 137/118.02 |
| 4,013,945 | A | * | 3/1977 | Grosso ................... 324/207.25 |
| 4,020,683 | A | * | 5/1977 | Young ........................... 73/114 |
| 4,130,095 | A | * | 12/1978 | Bowler et al. ............... 123/675 |
| 4,415,823 | A | * | 11/1983 | Jurgens ........................ 310/87 |
| 4,430,926 | A |  | 2/1984 | Wallace ........................ 91/516 |
| 4,664,084 | A | * | 5/1987 | Wheelock .................... 123/462 |
| 4,745,739 | A | * | 5/1988 | Bezard et al. ........... 60/39.281 |
| 4,751,942 | A | * | 6/1988 | Dyer et al. ............. 137/599.08 |
| 4,760,662 | A | * | 8/1988 | Dyer et al. .............. 60/39.281 |
| 4,763,626 | A | * | 8/1988 | Staerzl ........................ 123/438 |
| 4,825,707 | A | * | 5/1989 | Rosaen ..................... 73/861.77 |

(Continued)

OTHER PUBLICATIONS

International Search Report, Application No. PCT/US05/16292 dated Nov. 9, 2006.

*Primary Examiner*—Darren Schuberg
*Assistant Examiner*—Pedro J. Cuevas
(74) *Attorney, Agent, or Firm*—RatnerPrestia

(57) ABSTRACT

In a mobile fuel delivery vehicle, providing bulk aircraft fuel from a pressurized fuel reservoir to an aircraft, a method of regulating electrical output of an electrical power source, includes the steps of: (a) receiving, in a fluid path, the bulk aircraft fuel from the pressurized reservoir; (b) controlling flow rate of the fuel along the fluid path; (c) fluidically rotating a shaft of the electrical power source in the fluid path, in response to step (b); (d) sensing rotation speed of the electrical power source by measuring number of revolutions per a time period; (e) setting a predetermined rotation speed for the electrical power source; (f) measuring a difference between the sensed rotation speed of step (d) and the set predetermined rotation speed of step (e); and (g) modifying the flow rate of the fuel along the fluid path based on step (f) and, in turn, the electrical output of the electrical power source.

18 Claims, 11 Drawing Sheets

U.S. PATENT DOCUMENTS

| | | | |
|---|---|---|---|
| 5,028,017 A * | 7/1991 | Simmons et al. | 244/134 C |
| 5,065,717 A * | 11/1991 | Hosokai et al. | 123/339.23 |
| 5,092,748 A * | 3/1992 | Simmons, II | 417/423.1 |
| 5,131,591 A * | 7/1992 | Gill | 239/74 |
| 5,152,309 A * | 10/1992 | Twerdochlib et al. | 137/8 |
| 5,279,107 A * | 1/1994 | Meisner et al. | 60/773 |
| 5,287,884 A * | 2/1994 | Cohen | 137/486 |
| 5,325,884 A | 7/1994 | Mirel et al. | 137/110 |
| 5,433,118 A * | 7/1995 | Castillo | 73/861.77 |
| 5,517,464 A * | 5/1996 | Lerner et al. | 367/84 |
| 5,609,027 A | 3/1997 | Dunlevy | 60/396 |
| 5,626,200 A * | 5/1997 | Gilbert et al. | 175/40 |
| 5,727,933 A * | 3/1998 | Laskaris et al. | 418/2 |
| 5,768,883 A * | 6/1998 | Mayer | 60/773 |
| 5,775,101 A | 7/1998 | Dunlevy | 60/396 |
| 5,839,508 A * | 11/1998 | Tubel et al. | 166/65.1 |
| 5,957,148 A | 9/1999 | Sell | 137/115.21 |
| 6,012,339 A * | 1/2000 | Genack et al. | 73/861.77 |
| 6,152,162 A | 11/2000 | Balazy et al. | 137/110 |
| 6,324,840 B1 | 12/2001 | Watkins | 60/396 |
| 6,773,412 B2 * | 8/2004 | O'Mahony et al. | 604/5.01 |
| 6,789,434 B2 * | 9/2004 | Peterson | 73/861.77 |
| 6,889,700 B2 * | 5/2005 | George | 137/8 |
| 6,923,782 B2 * | 8/2005 | O'Mahony et al. | 604/4.01 |
| 6,998,724 B2 * | 2/2006 | Johansen et al. | 290/1 R |
| 7,181,964 B2 * | 2/2007 | Nivens et al. | 73/217 |
| 2002/0005197 A1 * | 1/2002 | DeVries et al. | 128/204.21 |
| 2002/0151804 A1 * | 10/2002 | O'Mahony et al. | 600/504 |
| 2003/0230307 A1 * | 12/2003 | DeVries et al. | 128/204.18 |
| 2004/0084358 A1 * | 5/2004 | O'Mahony et al. | 210/94 |
| 2004/0144427 A1 * | 7/2004 | George | 137/499 |
| 2004/0237911 A1 * | 12/2004 | Sano | 123/41.1 |
| 2005/0179263 A1 * | 8/2005 | Johansen et al. | 290/1 R |
| 2005/0254960 A1 * | 11/2005 | Watkins | 417/53 |
| 2006/0004330 A1 * | 1/2006 | Carlisle et al. | 604/246 |
| 2006/0009727 A1 * | 1/2006 | O'Mahony et al. | 604/4.01 |
| 2007/0185429 A1 * | 8/2007 | O'Mahony et al. | 604/4.01 |

* cited by examiner

FUEL DELIVERY SYSTEM AND METHOD PROVIDING REGULATED ELECTRICAL OUTPUT

CROSS REFERENCE TO RELATED APPLICATIONS

This application claims priority of U.S. Provisional Application Ser. No. 60/570,243, filed on May 12, 2004.

TECHNICAL FIELD

The present invention relates, in general, to a portable re-fueling vehicle and method for providing bulk fuel from a pressurized reservoir to aircraft at busy airports. More specifically, this invention relates to a bulk fuel delivery system and method with feedback control, in which a fluid driven power source is driven at controlled speeds to regulate electrical output from the power source.

BACKGROUND OF THE INVENTION

When fueling airplanes at the loading/unloading aprons of major airports, fuel is usually supplied at substantial pressure by underground mains to fuel hydrants located at each apron. A fuel cart is rolled up to the airplane and is hooked between the nearest fuel hydrant and the fuel filler connection on the airplane.

The cart performs several services ancillary to providing and transferring fuel. For example, a fuel cart has hose reels, filters, water separators, and a flow meter to measure the quantity of fuel, boarded on the aircraft, for billing purposes. Many of these and other ancillary services require the availability of compressed air and/or primary power.

U.S. Pat. No. 6,324,840, issued Dec. 4, 2001, to Owen Watkins of General Transervice Inc., Coatsville, Pa., discloses a bulk fuel delivery system for operating a fluid driven power source at a constant speed. This patent is incorporated herein by reference in its entirety.

As discussed in the Watkins' patent, the bulk fuel delivery system includes a fluid driven power source for operating auxiliary instrumentation, such as an air compressor and an alternator. Several flow monitors and valves are linked by fuel control lines. The flow monitors track the fluid flow rates and adjust the valves to regulate the flow rate through the fluid driven power source.

The present invention provides an improved fuel delivery system, by the same inventor, that includes a fluid driven power source operated at constant speed.

SUMMARY OF THE INVENTION

To meet this and other needs, and in view of its purposes, the present invention includes a mobile fuel delivery vehicle, providing bulk aircraft fuel from a pressurized fuel reservoir to an aircraft and regulated electrical output. A method of the invention regulates the electrical output of an electrical power source and includes the steps of: (a) receiving, in a fluid path, the bulk aircraft fuel from the pressurized reservoir; (b) controlling flow rate of the fuel along the fluid path; (c) fluidically rotating a shaft of the electrical power source in the fluid path, in response to step (b); (d) sensing rotation speed of the electrical power source by measuring number of revolutions per a time period; (e) setting a predetermined rotation speed for the electrical power source; (f) measuring a difference between the sensed rotation speed of step (d) and the set predetermined rotation speed of step (e); and (g) modifying the flow rate of the fuel along the fluid path based on step (f) and, in turn, the electrical output of the electrical power source.

The system and method of the invention also includes sensing the rotation speed of the electrical power source by coupling a speed sensor to the electrical power source, and directly sensing the number of revolutions per minute (RPM) of the electrical power source. The method further includes supplying the electrical output from the electrical power source to devices requiring electrical input signals in the vehicle.

The system and method of the invention further includes modifying the flow rate of the fuel along the fluid path, by disposing a valve in the fluid path for controlling the flow rate of the fuel in the fluid path, and electrically operating the valve based on the measured difference between the sensed rotation speed of the electrical power source and the set predetermined rotation speed. The valve dynamically moves at least 5 degrees in less than 50 milliseconds, and from a fully opened position to a fully closed position in less than 1 second.

Another embodiment of the present invention includes a system and method of regulating electrical output of an electrical power source in a mobile fuel delivery vehicle, that provides bulk aircraft fuel from a pressurized fuel reservoir to an aircraft. This other embodiment includes (a) receiving the bulk aircraft fuel from the pressurized fuel reservoir; (b) dividing the bulk aircraft fuel to flow along a primary fluid path and a secondary fluid path; (c) controlling flow rate of the fuel along the primary fluid path; (d) fluidically rotating a shaft of the electrical power source in the secondary fluid path in response to step (c); (e) sensing rotation speed of the electrical power source by measuring number of revolutions per a time period; (f) setting a predetermined rotation speed for the electrical power source; (g) measuring a difference between the sensed rotation speed of step (e) and the set predetermined rotation speed of step (f); and (h) modifying the flow rate of the fuel along the primary fluid path, based on step (g) and, in turn, the electrical output of the electrical power source.

Yet another embodiment of the present invention is a mobile fuel delivery vehicle, providing bulk aircraft fuel from a pressurized fuel reservoir to an aircraft. A method of the invention regulates electrical output of an alternator driven by a turbine that is in the vehicle. The method includes the steps of: (a) receiving the bulk aircraft fuel from the pressurized fuel reservoir; (b) dividing the bulk fuel to flow along a primary fluid path and a secondary fluid path; (c) controlling flow rate of the fuel along the primary fluid path; (d) fluidically rotating a shaft of the turbine in the secondary fluid path in response to step (c); (e) sensing rotation speed of the turbine; (f) setting a predetermined rotation speed for the turbine; (g) measuring a difference between the sensed rotation speed of step (e) and the set predetermined rotation speed of step (f); and (h) modifying the flow rate of the fuel along the primary fluid path based on step (g) and, in turn, the electrical output of the alternator. The method further includes executing a control loop algorithm in a programmable logic controller (PLC) to control the rotation speed of the turbine. Controlling the rotation speed of the turbine includes controlling rotation speed of the turbine at nearly constant speed, at varying output loads on the alternator driven by the turbine.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention provides a bulk fuel delivery control system, in which a fluid driven power source is driven at constant speed by fuel flow, in order to operate auxiliary instrumentation requiring regulated primary power.

Figure 1:
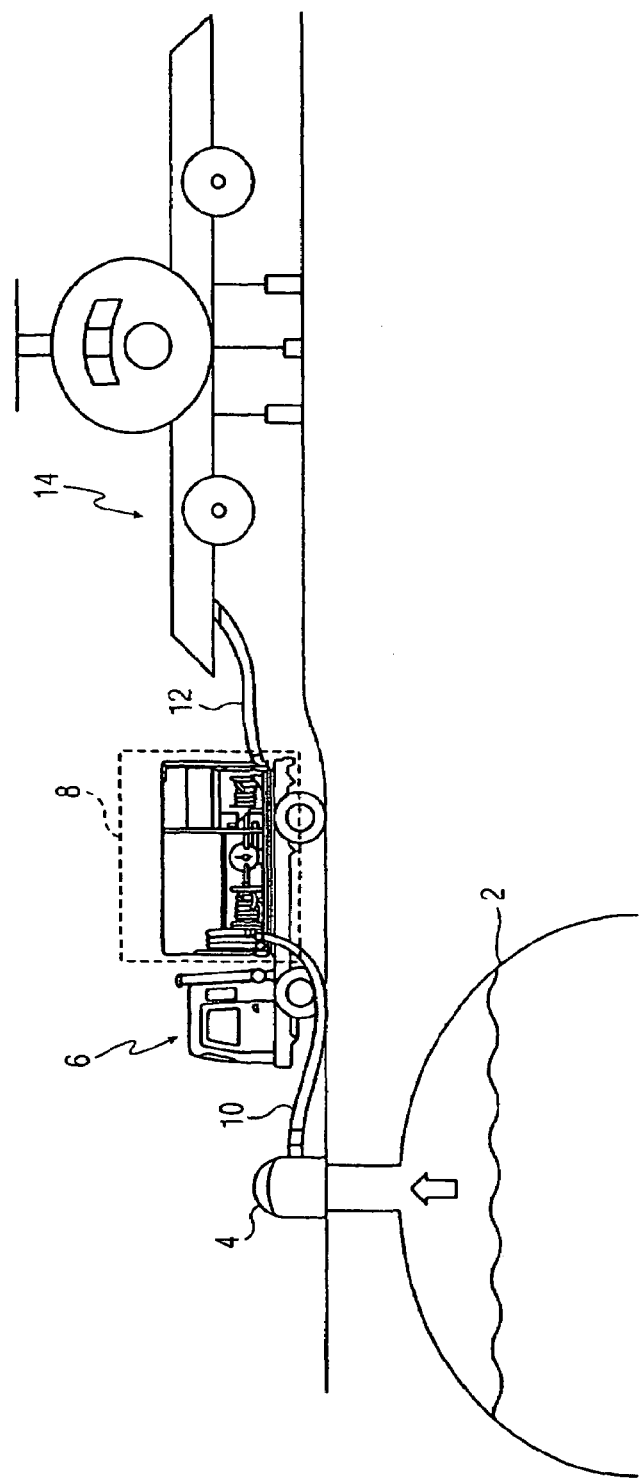
FIG. 1 is a plan view of a hydrant re-fueler vehicle providing bulk fuel from a fuel reservoir to an aircraft.

Referring now specifically to the illustrations, FIG. 1 shows re-fueler vehicle 6. The re-fueler vehicle generally functions to channel fuel from a pressurized fuel hydrant 4 to aircraft 14. The hydrant provides bulk fuel from a subterranean reservoir 2 of a re-fueling facility to a fuel tank of the aircraft (not shown). It is recognized by those skilled in the art that reservoir 2 may be located above ground, such as a mobile reservoir source.

A first fueling couple 10 of re-fueler vehicle 6 is connected to the hydrant for receiving fuel from reservoir 2. The couple is in fluidic communication with a bulk fuel delivery system 8 of re-fueler vehicle 6. The bulk fuel delivery system 8 includes a fluid driven power source 28 for operating auxiliary instrumentation (shown, for example, as turbine 28 in FIG. 2). A second fueling couple 12 is in fluidic communication with bulk fuel delivery system 8 and is connected to aircraft 14 for refueling purposes. In this way, pressurized fuel flows into bulk fuel delivery system 8 of re-fueler vehicle 6 for fueling aircraft 14.

The inventor discovered that the environment shown in FIG. 1 presents unique problems. A first problem is the constantly varying fluid flow pressure coming from reservoir 2. As the number of fueling vehicles under operation changes, so does the fluid flow pressure. Accordingly, the source pressure at fueling couple 10 is constantly changing. The inlet pressure at couple 10 (or inlet 22 in FIG. 2) may vary between approximately 50-250 psi. The inlet pressure may drop, for example, from 100 psi to 60 psi in less than 3 seconds. A second problem is the varying flow rate at the nozzle (not shown) attached to fueling couple 12. As the aircraft fuel tank is filled, the nozzle pressure changes. For safety considerations, the nozzle pressure (sink pressure) is limited to 40 psi. The nozzle pressure however, may increase to 100 psi in approximately 0.5 seconds. A third problem is the electrical load connected to the primary power source, which is also constantly changing. The primary power source, as an alternator, for example, may have wildly differing loads. The load may have a peak as high as 60 amperes and may decrease to as low as 5 amperes, typically. The load fluctuates as the refueling vehicle expands energy moving from one aircraft to another. As one example, when a lift basket is actuated on the refueling vehicle, the load jumps almost instantaneously to 40 amperes. When the lift basket is turned off, however, the load drops almost instantaneously by 40 amperes. The batteries (load) on the vehicle, being charged by the alternator, require more current to recharge. As the electrical load changes, so does the amount of horsepower required to drive fluid driven power source 28 (for example, turbine 28 in FIG. 2). The present invention solves these problems.

Figure 2:
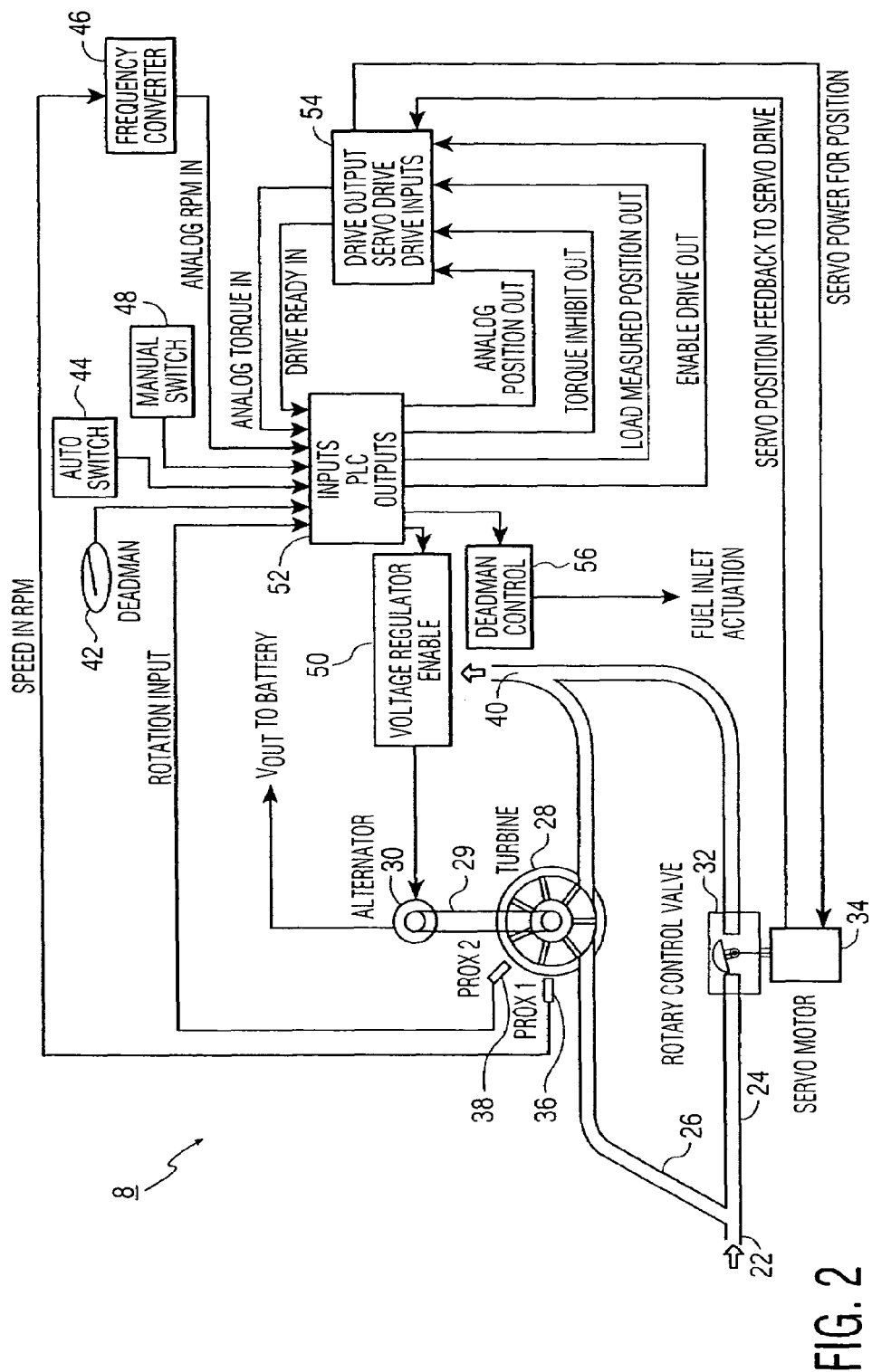
FIG. 2 is a schematic block diagram of a bulk fuel delivery system of the re-fueler vehicle of FIG. 1, in accordance with an embodiment of the present invention.

Referring now specifically to FIG. 2, bulk fuel delivery system 8, configured in accordance with the present invention, will now be described. Bulk fuel provided from first fueling couple 10 flows through inlet 22 as a conduit for the bulk fuel. The bulk fuel then divides along a primary fluid path and a secondary fluid path, generally designated 24 and 26, respectively. The secondary fluid path 26 carries a portion of the fuel provided into inlet 22. The remainder portion of the bulk fuel is carried along primary fluid path 24 into rotary control valve 32.

It will be appreciated that the amount of fuel in the primary fluid path and secondary fluid path depend on the flow rate at inlet 22. If the flow rate drops below 250 gallons per minute (for example), most of the fuel flows through the secondary fuel path as the control system attempts to regulate the speed of the turbine.

It will be understood that the terms "primary fluid path" and "secondary fluid path" do not imply that most of the fuel flows through the primary fluid path and only a small portion of fuel flows through the secondary fluid path. In fact, depending on the flow rate at inlet 22, the secondary fluid path may take most of the fluid flow through it, and only a small portion of the fuel may flow through the primary fluid path, as described above. The opposite may also be true.

The secondary fluid path 26 is coupled to a fluid driven power source, such as turbine 28. As the fluid flowing from inlet 22 moves toward outlet 40, the shaft of turbine 28 rotates. Rotation of the shaft of turbine 28 causes rotation of pulley 29 which, in turn, causes rotation of a motor in alternator 30. Alternator 30 provides a regulated charging voltage of approximately 56V to a battery providing 48V nominal output to various instrumentation and other loads, as required in the aircraft re-fueling environment. The manner in which alternator 30 provides a regulated voltage output (Vout) is described below.

The primary fluid path 24 is connected to rotary control valve 32 for passage of fuel from inlet 22 to outlet 40. Servo motor 34 controls the valve position of rotary control valve 32. A completely closed valve position forces more fuel from inlet 22 to flow through secondary fluid path 26. A completely open valve position, on the other hand, forces less fuel to flow through the secondary fluid path and more fuel to flow through primary fluid path 24. The valve position of the rotary control valve may be regulated by servo motor 34 in a linear manner between completely opened and completely closed, in accordance with an embodiment of the invention.

As will be explained, fuel enters secondary fluid path 26 and begins turning turbine 28 and alternator 30. As the turbine spools up, two speed sensors 36 and 38 (shown as Prox 1 and Prox 2) send signals to programmable logic controller (PLC) 52. Prox 2 senses that turbine 28 is rotating. Prox 1 senses the speed of rotation, or the revolutions per minute (RPM) of turbine 28, and provides an analog RPM value, by way of frequency converter 46, as an input signal to PLC 52.

These sensors may be inductive proximity switches, for example, as manufactured by Turck (Part No. BI1, 5-G08-AP6X-H1341) or by Pepperl+Fuchs (Part No. NBB2-8GM40-E2-V1).

Servo drive 54, which is an interface module between PLC 52 and servo motor 34, provides position control to servo motor 34 which, in turn, controls the valve position of rotary control valve 32. An exemplary rotary control valve may be an eccentric plug, Model No. 35x12, manufactured by Masoneilan. This valve provides good pressure control over the required dynamic range. It will be understood that the servo motor is required to be sufficiently strong to control the valve position of the rotary control valve with about 100 foot-pounds of torque.

An exemplary servo motor may be the Exlar SLG90, manufactured by Exlar, or another similar servo motor manufactured by Bayside Motion Control. The servo motor may rotate about 90 degrees in less than one second (fully open to fully closed positions). This rotation allows moving the valve position of the rotary control valve from fully opened to fully closed in less than one second. The servo motor may rotate at least five degrees in less than 50 milliseconds (approximately). As will be discussed, the control loop of the invention operates in about a 50 millisecond period. The servo motor is suited for this unique and difficult environment, allowing for about 100 foot-pounds of torque to move the valve position at least five degrees in less than 50 milliseconds.

The inventor discovered that servo motor 34 in FIG. 1 (or servo motor 1304 in FIG. 5) may rotate about 90 degrees in less than 1 second (0.9 seconds), or about 5 degrees in less than 50 milliseconds (most preferred), in order to adequately control the unique and difficult environment of the fuel delivery system described above. A slower rotation of the rotary control valve may also be adequate for the fuel delivery system. For example, the servo motor may rotate about 90 degrees in less than 2 seconds (1.8 seconds) or about 2.5 degrees in less than 50 milliseconds and still be adequate for the fuel delivery system (more preferred). As another example, the servo motor may rotate about 90 degrees in less than three seconds and may yet be adequate for the fuel delivery system. Any slower rotation than 90 degrees in about 3 seconds may likely not work with the control algorithms executed by PLC 52. As described later, the turbine is set to a predetermined speed, such as 2200 RPM. Under speed of the turbine is, generally, not a problem. Over speed of the turbine, however, is a problem and is dangerous to the bearings (for example). With the preferred servo motor rotation of about 90 degrees in less than 1 second, the turbine may be set to the 2200 RPM, without need for slowly ramping up the speed of the turbine and verifying the speed of the turbine at each point on the ramp. For example, with a servo motor that rotates at a slow speed of 90 degrees in 3 seconds to 5 seconds (approximately), a ramp up of the speed needs to be implemented by PLC 52. The ramp up may include stop and verify speeds of, for example, 700 RPM, 1500 RPM and finally 2200 RPM. Similarly, if the desired speed of the turbine is 700 RPM and the turbine is spinning at 2400 RPM, a ramp down speed is needed that includes stop and verify speeds on the ramp. With a servo motor controlled at 90 degrees in less than 1 second, on the other hand, no ramp up points, nor ramp down points are needed. This simplifies the algorithms executed by PLC 52.

The PLC compares the RPM (sensed by Prox 1) with a predetermined set point RPM (a variable value which may be set in the program, for example, a value of 2000 RPM). The predetermined set point is provided to a PID subroutine (explained later), which calculates an analog output (shown as Analog Position in FIG. 2). This analog output is provided to servo drive 54 which, in turn, controls servo motor 34. The valve of rotary control drive 32 is positioned toward the closed position, if the RPM of turbine 28 is too low. The valve is positioned toward the opened position, however, if the RPM is too high. As the valve position is changed, the turbine speed is changed which, in turn, is sensed by Prox 1 for feedback to PLC 52.

It will be appreciated that a waveform (speed versus time) generated by the speed of the turbine includes a decreasing oscillation. As the turbine speed diverges from the predetermined set point, a feedback signal to the valve corrects the turbine RPM toward the set point value. The feedback signal continues in time as a decreasing oscillating amplitude. The oscillation amplitude decreases as each correction is made to the turbine speed, until the RPM of the turbine settles on the predetermined set point value. The present invention advantageously maintains a nearly constant RPM, under varying inlet fuel pressures and varying loads on the alternator. The present invention controls the speed of the turbine at near constant speed and, does so, independently of other variables in the system. (An exception to this is an environment in which the pressure of fuel flow is so low that the rotary valve is fully closed by the servo motor, causing all the fuel to flow in the secondary fluid path.)

Continuing the description of FIG. 2, there is shown deadman switch 42, deadman control 56, voltage regulator enable 50, auto switch 44 and manual switch 48. Deadman switch 42 is activated by an operator to provide a deadman input signal to PLC 52. The deadman input signal is present, so long as the deadman switch is depressed by the operator. In turn, the PLC provides a deadman output signal, when safety considerations are satisfied. The deadman output is sent to deadman control module 56. The deadman control module provides an actuation signal to enable fuel to flow from reservoir 2 (FIG. 1) into inlet 22.

Manual switch 48 applies power to drive the valve of rotary control valve 32 to a fully opened position, by way of a command signal from PLC 52 and servo drive 54. This is a safety consideration to assure that most of the inlet fuel flows through primary fluid path 24 during initial startup of system 8. It will be appreciated that manual switch 48 may be omitted and the system may be operated in an automatic mode.

The automatic mode, as shown, is enabled by auto switch 44. Upon enablement of the automatic mode, the control loop between turbine 28, PLC 52, servo drive 54, servo motor 34 and rotary control valve 32 assumes control of the operation of system 8. The algorithms (explained later) of the present invention are effective in maintaining a near constant RPM for the turbine. The near constant rotation of the turbine provides a constant charging voltage of approximately 56V to a battery with a nominal output of 48V (not shown).

Completing description of FIG. 2, voltage regulator enable module 50, by way of a control signal from PLC 52, enables the magnetic field of alternator 30. This provides a spinning-start of the alternator. This spinning-start is useful in environmental conditions, in which the fuel pressure at inlet 22 drops sufficiently low so as not having sufficient torque to start the turbine rotation.

Figure 3A:
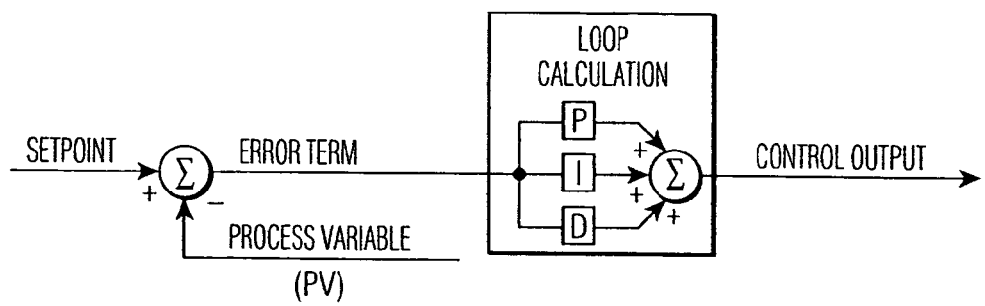
FIGS. 3A and 3B are schematic block diagrams showing exemplary proportion, integral, derivative (PID) controls, as executed by a programmable logic controller (PLC) embodied in the fuel delivery system of FIG. 2.

The various algorithms executed by PLC 52 will now be described. One of these algorithms, shown schematically in FIG. 3A, is the PID calculation. The PID calculation provides a control output signal which is a sum of proportional (P), integral (I) and derivative (D) terms of a calculated error in a single calculation loop. On each calculation of the PID loop, each term receives the same error signal value.

The role of the P, I, and D terms in the PID calculation are as follows:

(a) Proportional—The proportional (or ramp) term responds proportionally to the current size of the error. This loop controller calculates a proportional term value for each PID calculation. When the error is zero, the proportional term is also zero.

(b) Integral—The integrator (or reset) term integrates (sums) the error values. Starting from the first PID calculation after entering Auto Mode, the integrator keeps a running total of the error values. In the PID equation, when the loop reaches equilibrium and there is no error, the running total represents the constant output required to hold the current position of the process variable (PV).

(c) Derivative—The derivative (or rate) term responds to change in the current error value from the error used in the previous PID calculation. Its task is to anticipate the probable growth of the error and generate a contribution to the output in advance.

The P, I, and D terms work together. Any one of these terms may be set to zero.

Figure 3B:
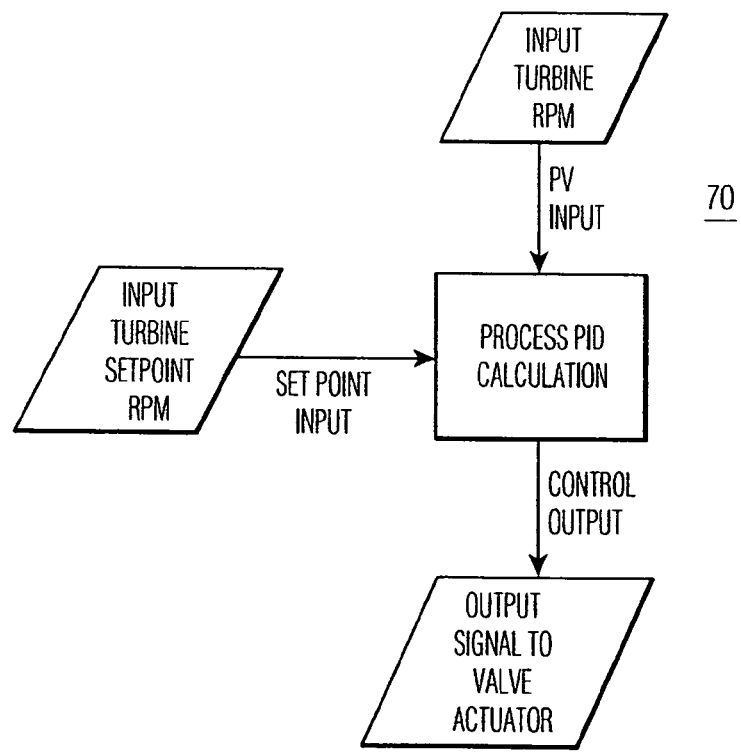

FIG. 3B shows a schematic block diagram of the PID calculation executed by the PLC, generally designated as 70. As shown, the process PID calculation includes the set point and the process variable (PV) as two separate input signals. The set point is user adjustable, and may be set to 2000 RPM, for example. The process variable (PV) is the actual, presently measured turbine RPM, as sensed by proximity sensor 1 (Prox 1). These two inputs are subtracted from each other to yield the error term. The error term is processed by the P, I and D terms, and summed together to produce the control output signal. As shown, the control output signal is sent to servo drive 54 from PLC 52 (FIG. 2). This signal is then communicated to servo motor 34 which, in turn, controls the valve position of rotary control valve 32.

Figure 4A:
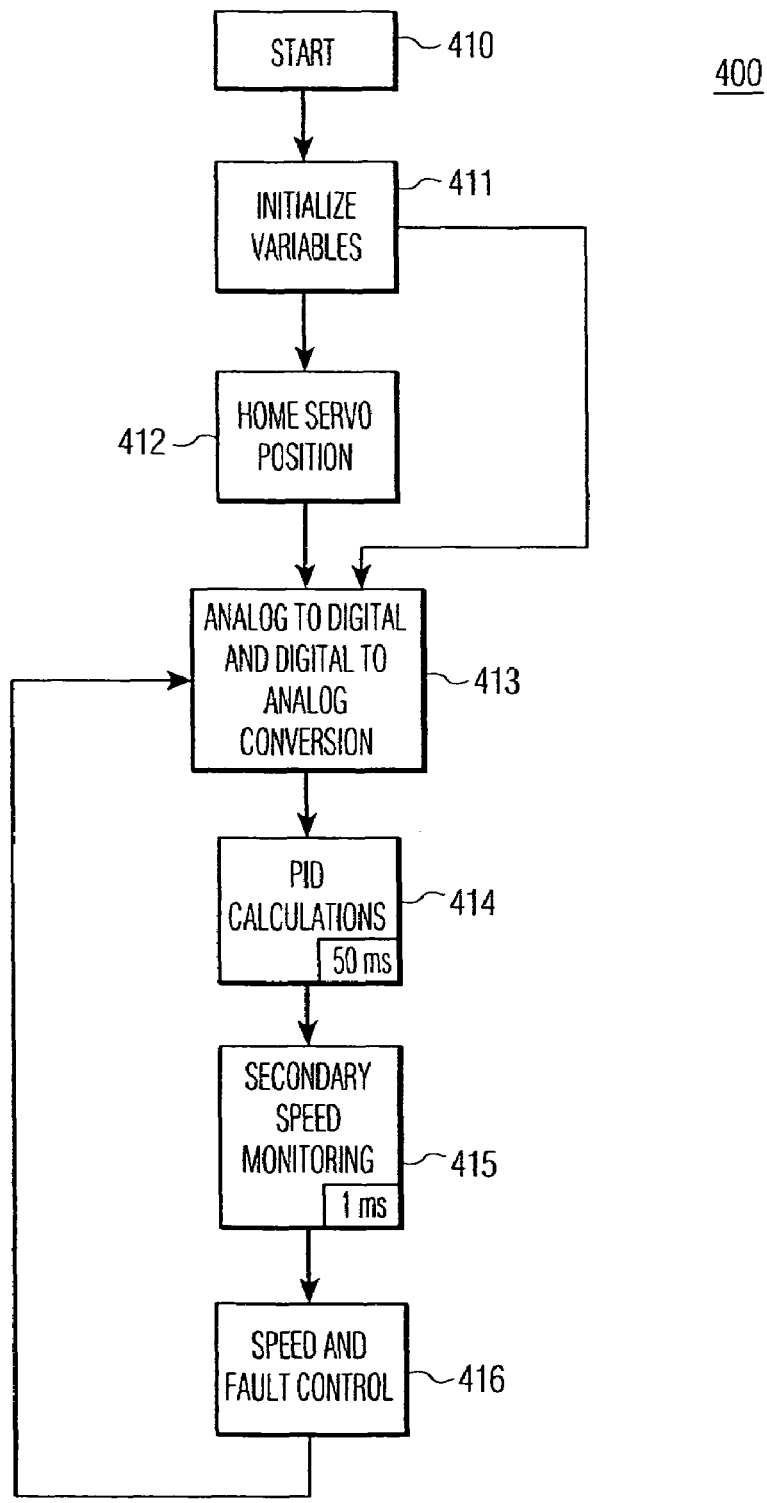
FIGS. 4A-4G are logic flow block diagrams depicting a method of the invention, as executed by the PLC of FIG. 2, in accordance with an embodiment of the invention.

Referring next to FIGS. 4A-4G, there is shown method 400 as one exemplary embodiment of the invention. Referring first to FIG. 4A, the method starts with step 410. The variables used by the method of the invention are initialized in step 411. The servo motor is initialized by setting it to the home position in step 412. The method then proceeds to step 413, in which the analog-to-digital and digital-to-analog conversions are processed.

The method then processes the PID calculations in step 414, at a 50 millisecond rate. A secondary speed monitoring loop is executed in step 415, at a 1 millisecond rate. The speed and fault control algorithms are executed in step 416. The method then branches back to step 413 and the process is repeated.

Figure 4B:
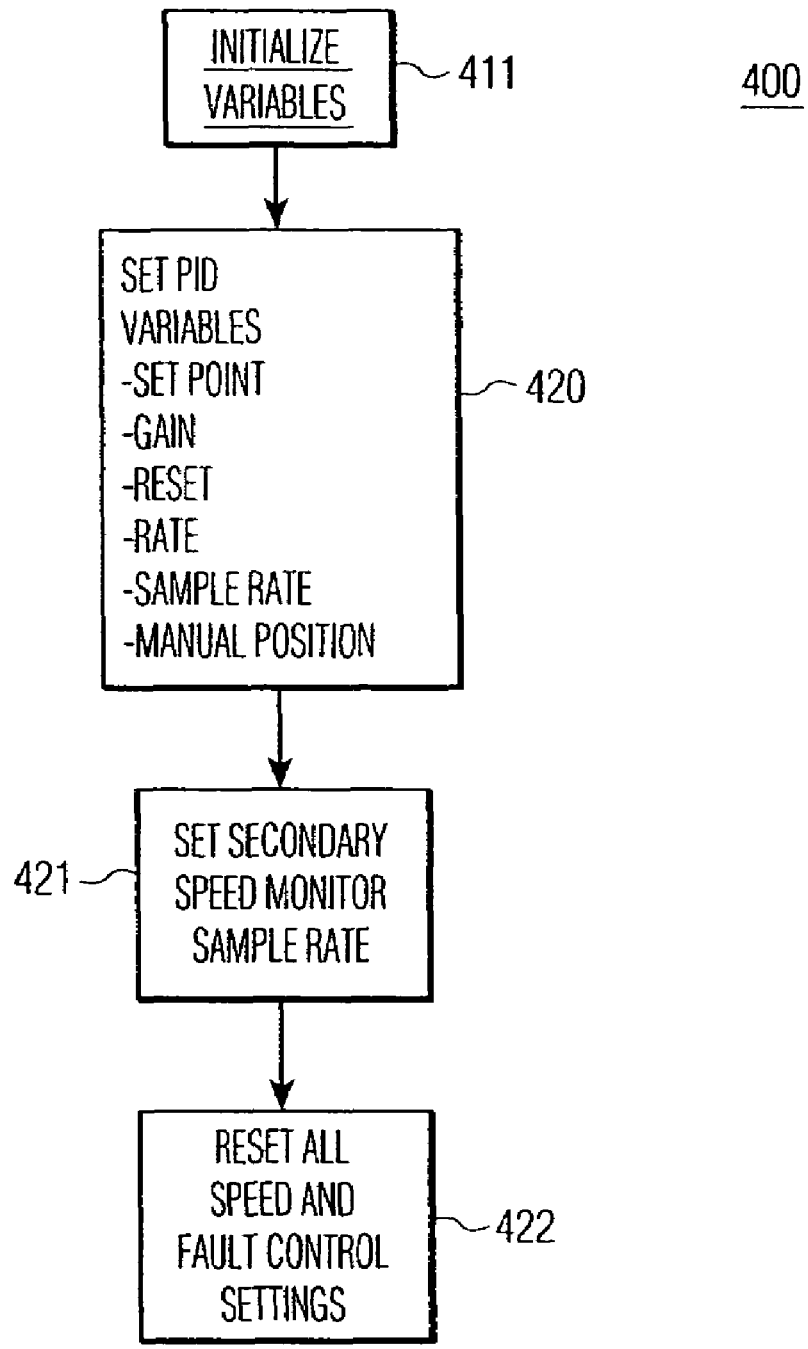

Each of the steps referred to in FIG. 4A will be described in greater detail by reference to FIGS. 4B-4G. Referring to FIG. 4B, initialization of the variables begins at step 420, in which the PID variables are set to their initial values. The PID variables are the setpoint, gain, reset, rate, sample rate and manual position. The setpoint is set to 2000 RPM, for example. The gain is the proportional constant used for the ramp of FIG. 3A and is set to a slope value of 2.3. The reset is used in the integral loop calculation of FIG. 3A. The reset value is set to 0.04 minutes. Thus, the integration occurs over a 0.04 minute interval. The rate value, or derivative value, is set to 0.001 in this embodiment of the invention (but may be set to zero). The sample rate is set to 50 milliseconds. Accordingly, the PID calculations occur within a 50 millisecond interval and are repeated every 50 millisecond interval. The manual position is set to zero. When the manual position is false (zero), the PID loop is enabled. When the manual position is true, however, the PID loop may be turned off.

After setting the PID variables, the method branches to step 421 and sets the secondary speed monitor sampling rate. In an exemplary embodiment of the invention, the secondary speed sampling rate is set to a 1 millisecond interval. Step 422 resets the speed and fault control settings as part of the initialization process.

Figure 4C:
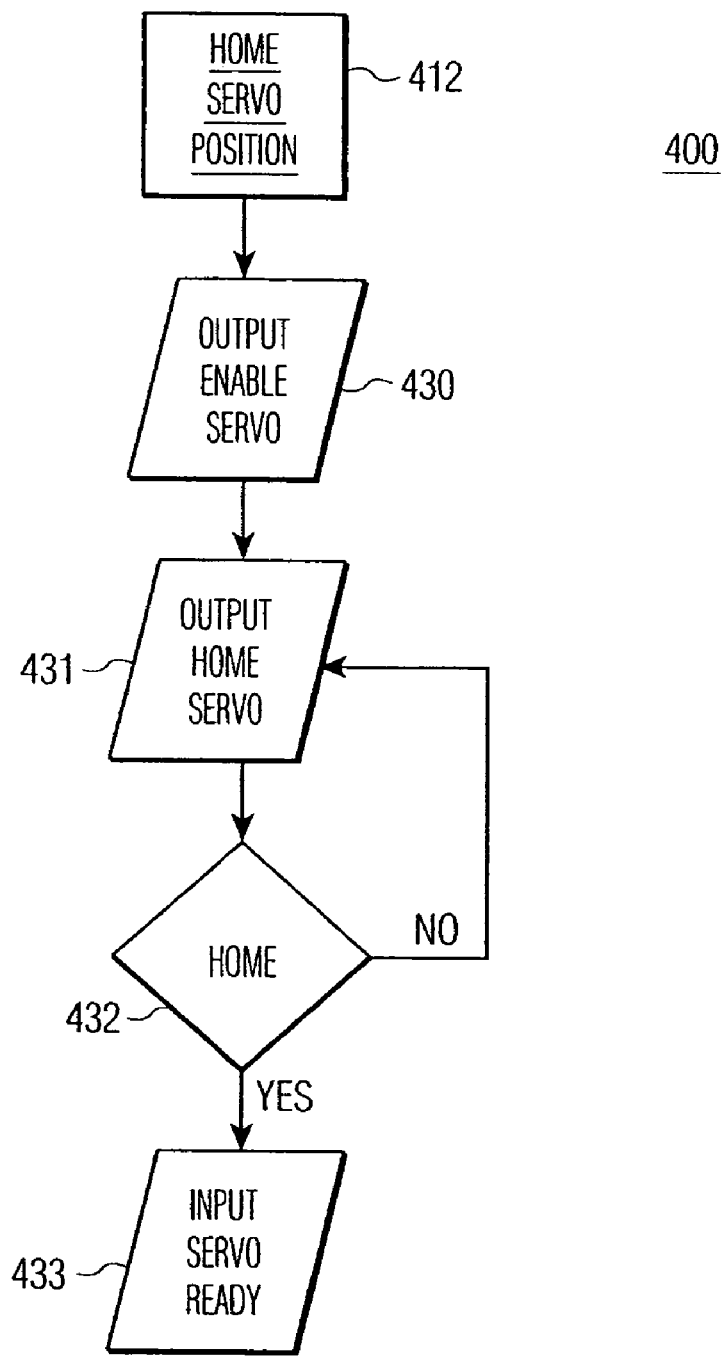

Referring next to FIG. 4C, method 400, for safety purposes, sets the servo position to home. Beginning at step 430, the method provides the enable servo output (shown as the enable drive from PLC 52 to servo drive 54). Step 431 commands servomotor 34 to the home position. The method, through decision box 432, verifies that the servomotor is, indeed, in the home position. The method continues checking that the servomotor is in the home position by looping back to step 431. When decision box 432 concludes that the servomotor is in the home position, the method branches to step 433 and informs PLC 52 that the servomotor is ready to be controlled.

Figure 4D:
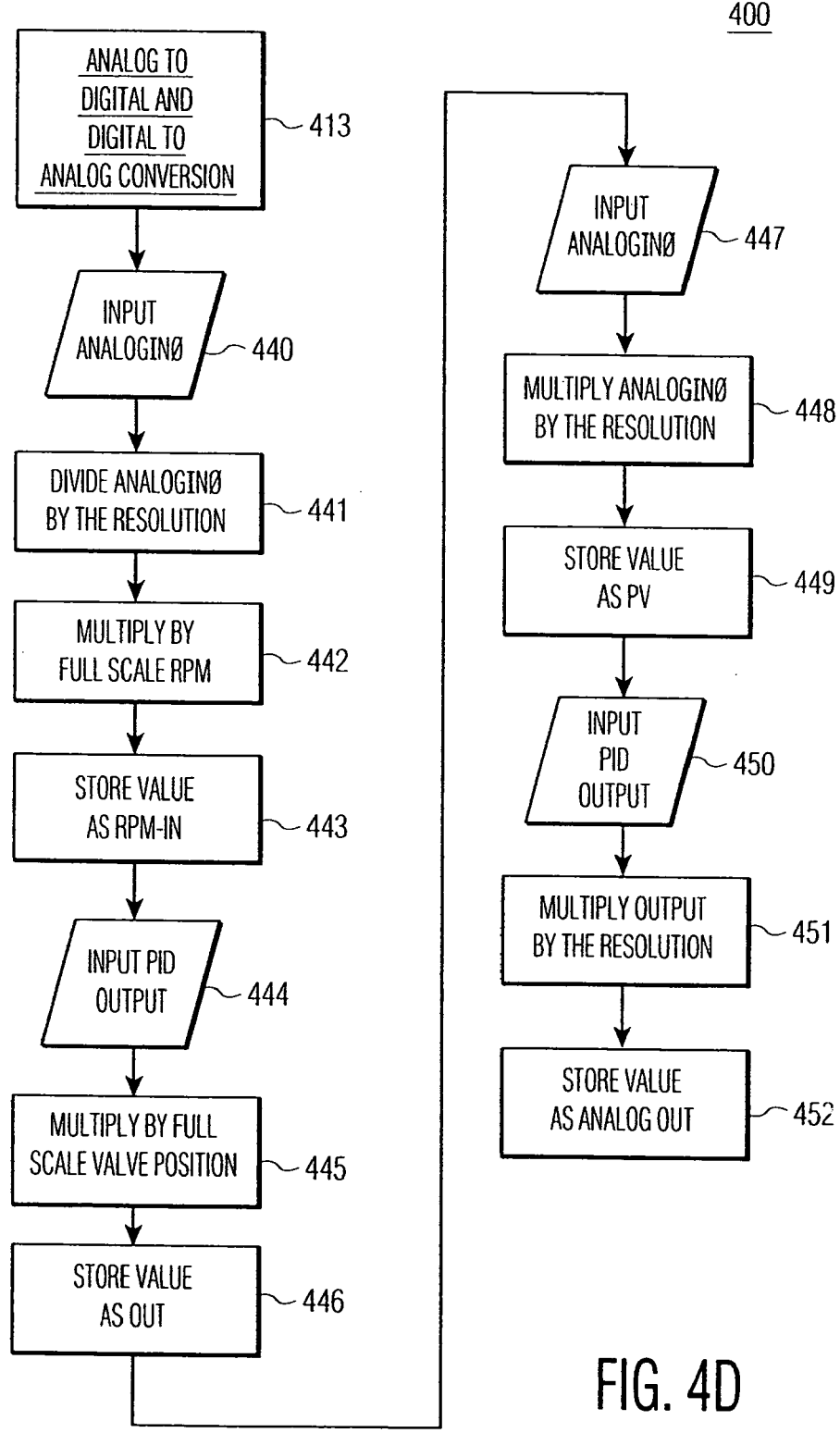

Referring next to FIG. 4D, method 400 provides conversions of analog signals into digital signals and, visa versa, digital signals into analog signals. Beginning at step 440, the method inputs the analog signal from frequency converter 46 (designated as analog RPM in FIG. 2) to the PLC algorithms. Step 441 divides the analog input signal by its resolution. Step 442 then multiplies the signal, output by step 441, by its full scale RPM value. The resulting value is stored as RPM-IN in step 443.

The PID output signal is provided to the algorithm in step 444. Step 445 multiplies the PID output by its full scale valve position. Step 446 stores the PID output value as an output signal.

Step 447 provides the analog input signal. Step 448 multiplies the analog input signal by the resolution. Step 449 stores the value as the process variable (PV). The PID output is inputted to the algorithm in step 450 and then multiplied by the resolution in step 451. The value is stored as the analog output signal in step 452.

Figure 4E:
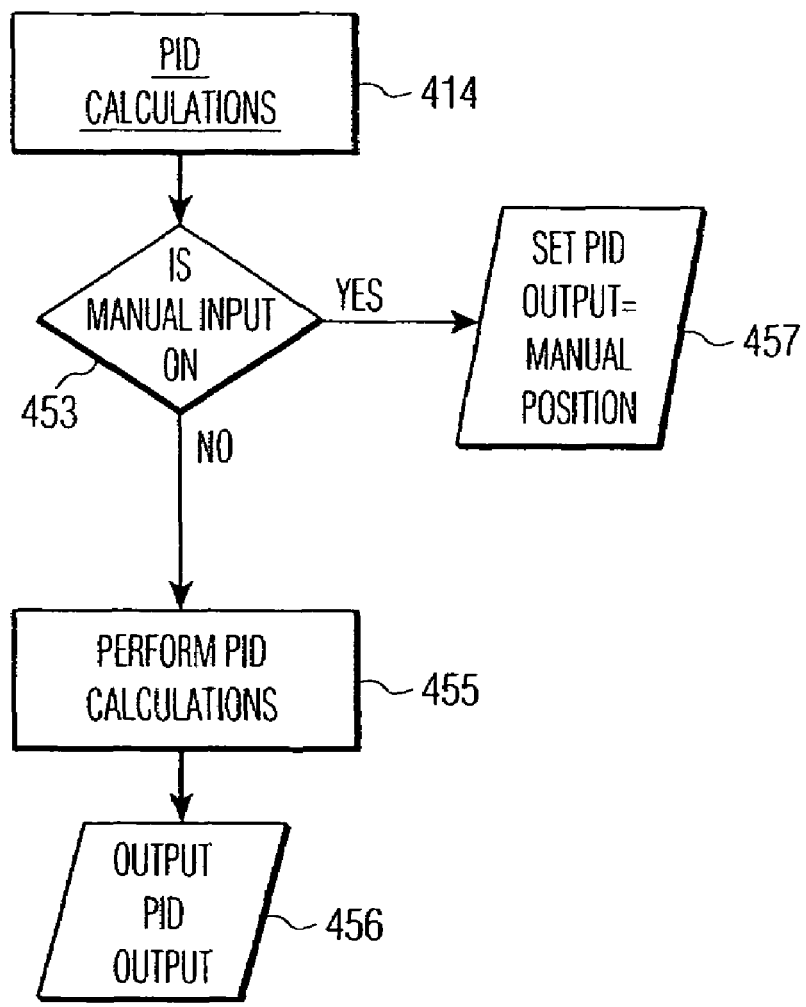

Referring next to FIG. 4E, method 400 performs the PID calculations. Beginning in decision box 453, the method determines whether the manual input is on. If the manual input is on, then the method branches to step 457 and sets the PID output equal to the manual position. If decision box 453 determines that the manual input is off, the method branches to decision box 455 and performs the PID calculations. Step 456 provides the output of the PID calculations.

It will be appreciated that for safety considerations, method 400 performs the PID calculations only when the method is not in the manual position.

Figure 4F:
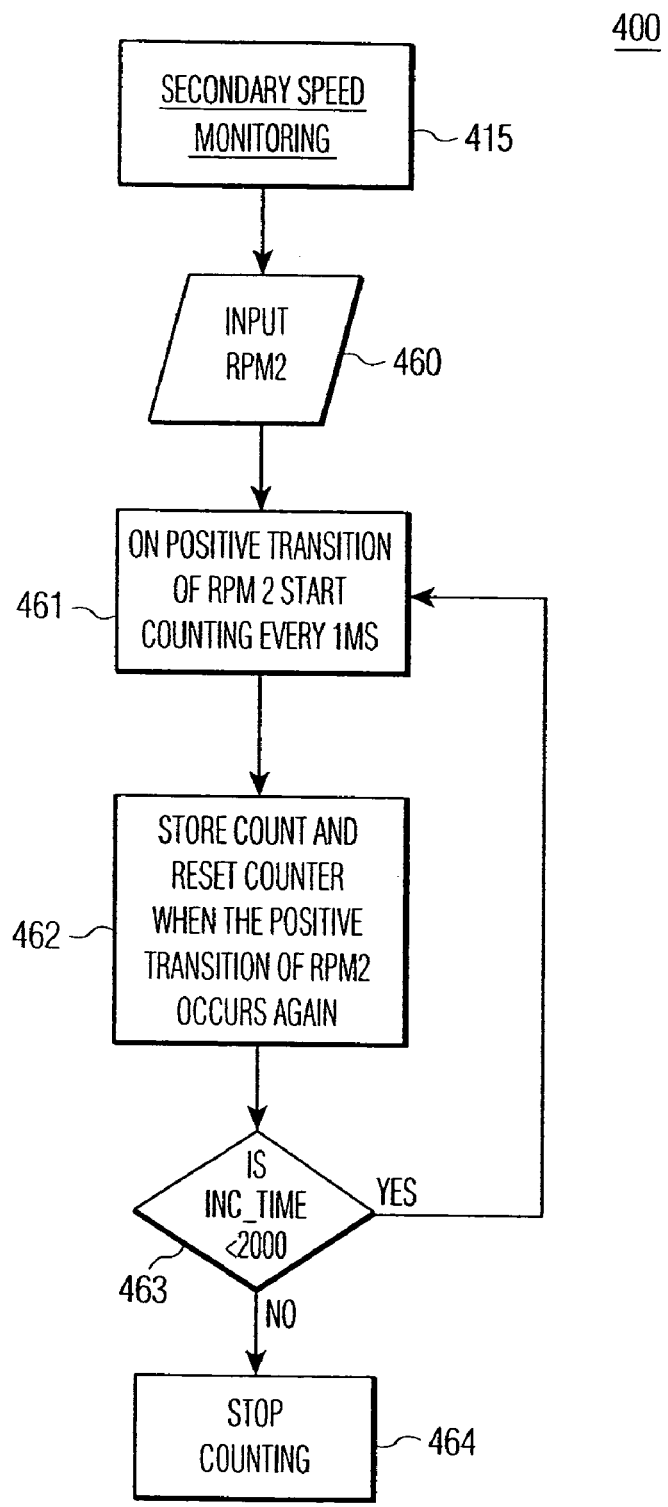

Referring next to FIG. 4F, method 400 performs the secondary speed monitoring. Beginning in step 460, the RPM2 signal (secondary speed monitoring by speed sensor 2) is inputted as a signal into PLC 52. Step 461 starts counting on the positive transition of the RPM2 signal at a 1 millisecond rate. Step 462 stores the count, and resets the counter when a positive transition of RPM2 occurs again. Decision box 463 determines if the incremental time is less than 2 seconds. If the incremental time is less than 2 seconds, the method branches back to step 461, and continues to accumulate the count. If decision box 463 determines that the incremental time is greater than or equal to 2 seconds (2000 value), the method branches to step 464 and stops the count.

Figure 4G:
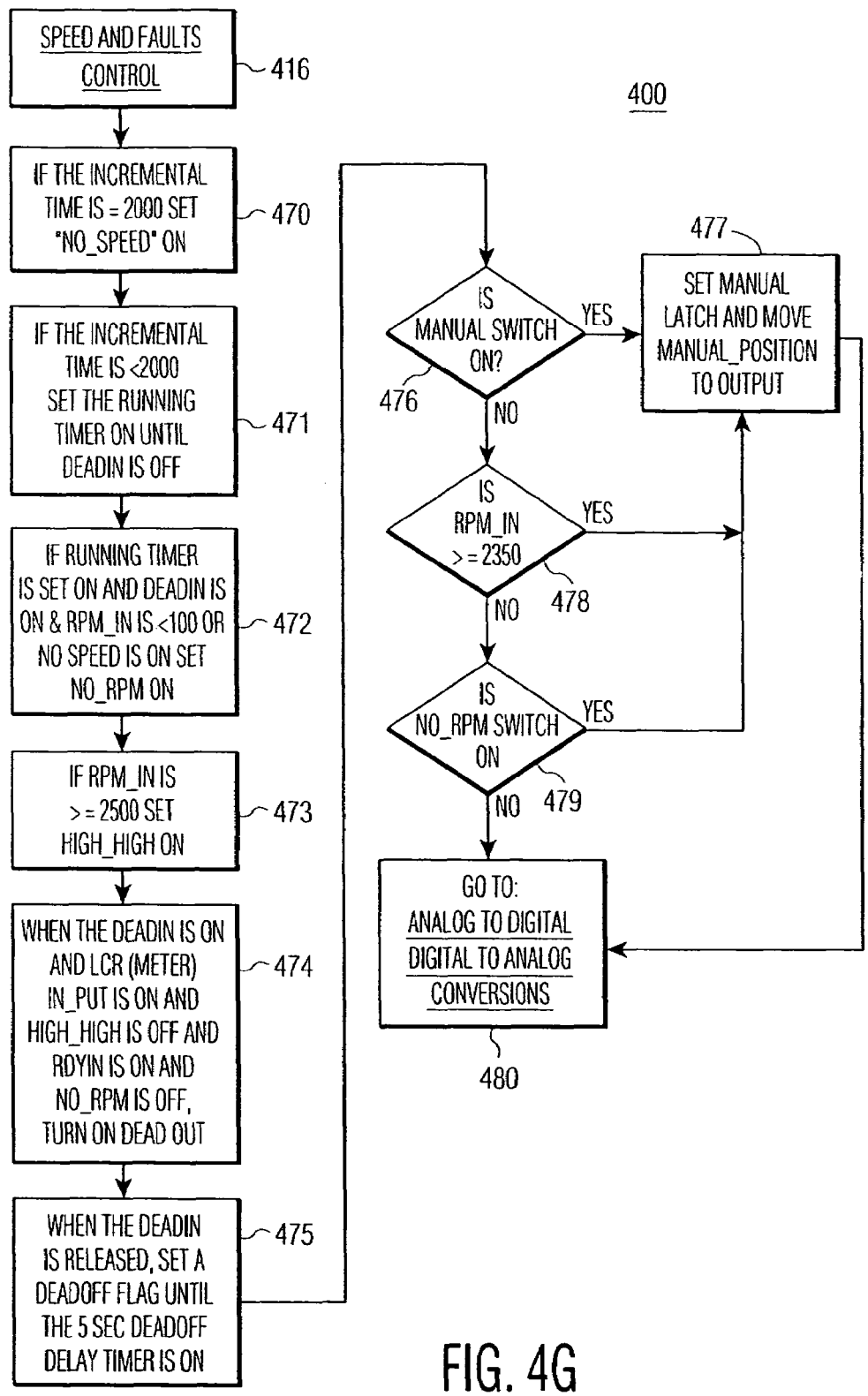

Referring to FIG. 4G, the method provides speed and fault controls beginning at step 470. Method 400 determines whether the incremental timer is equal to 2 seconds. If it is equal to 2 seconds, the no_speed flag is set. Step 471 determines if the incremental timer is less than 2 seconds. If it is less than 2 seconds, the running timer is started, until the deadman_in is off. Step 472 determines if the process is running, and the deadman_in is activated, and the RPM input is less than 100, or there is no speed, then the no_RPM flag is set.

Step 473 determines if the RPM input is greater than or equal to 2500. If it is greater than or equal to 2500, the high_high flag is set, which indicates that the RPM is too high. Step 474 determines if the deadman input is activated, and the LCR input (meter) is on, and the high_high flag is off, and the ready input from the servo drive is on, and no_RPM is off, then the deadman output is set.

Step 475 determines when the deadman input is released, If the deadman input is released, the method holds the deadman off flag on, until the deadman off delayed timer becomes true after 5 seconds.

Method 400 then enters decision box 476. Decision box 476 determines whether the manual switch is on. If it is on, then step 477 sets the manual latch and moves the manual position to the output. If decision box 476 determines that the manual switch is off, then the method enters decision box 478.

Decision box 478 determines whether the RPM input is greater than or equal to 2350. If it is determined that the RPM input is greater than or equal to 2350, the method branches to step 477 and sets the manual latch and moves the manual position to the output.

If decision box 478 determines that the RPM input is less than 2350, then the method enters decision box 479. Decision box 479 determines whether the no_RPM switch is on. If the switch is on, the method branches to step 477 and sets the manual latch and moves the manual position to the output.

If decision box 479 determines that the no_RPM switch is off, the method branches to step 480 and goes to the subroutine that provides the analog to digital and digital to analog conversions.

Figure 5:
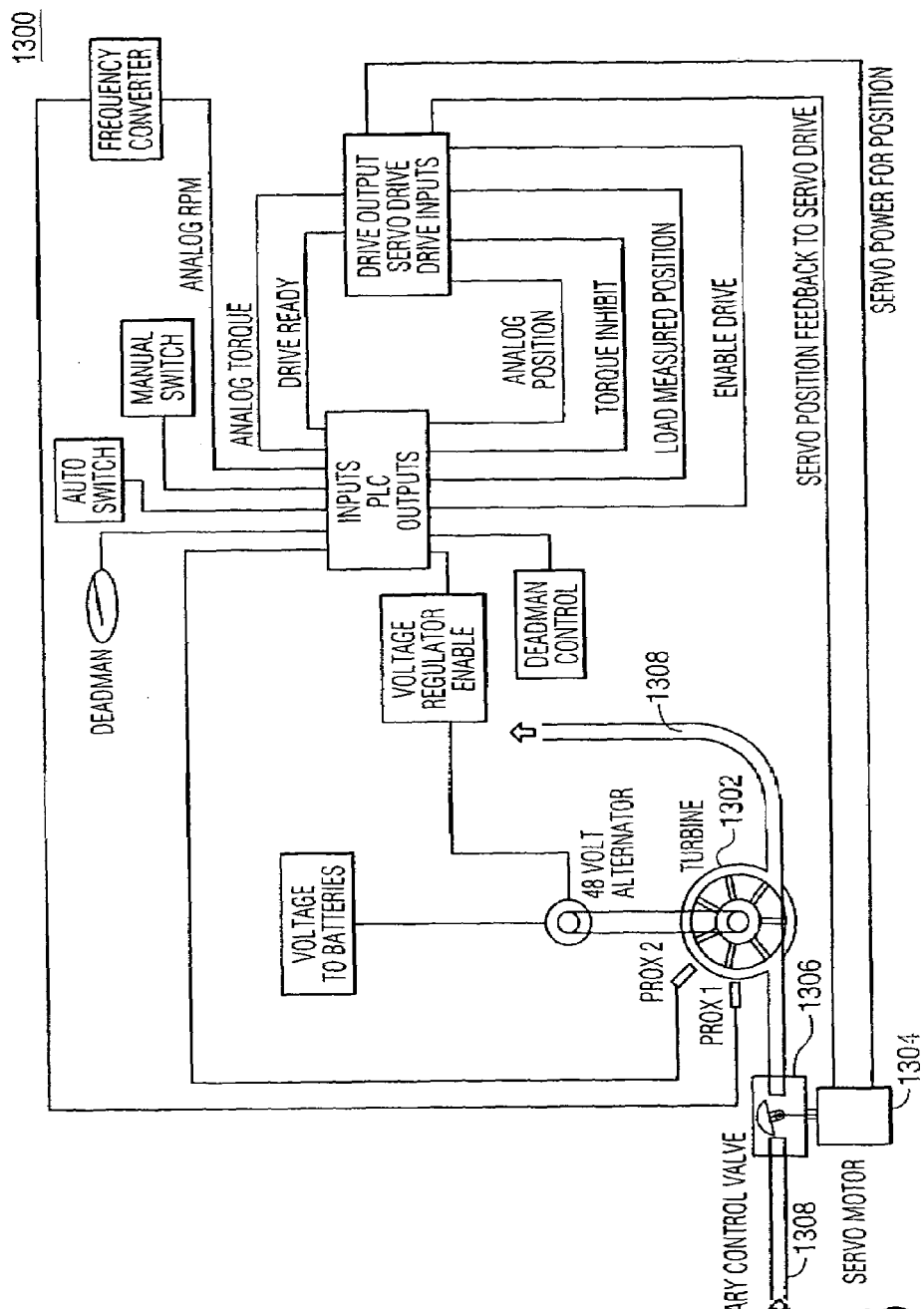
FIG. 5 is a schematic block diagram of a bulk fuel delivery system of the re-fueler vehicle of FIG. 1, in accordance with another embodiment of the present invention.

Turning next to another embodiment of the invention, reference is made to FIG. 5. As shown, system 1300 includes rotary control valve 1306 placed in the same fluid flow path as turbine 1302. Accordingly, this embodiment is different from the embodiment of the system shown in FIG. 2, in which the rotary control valve is positioned in a fluid flow path that is parallel to a fluid flow path turning the turbine. The servo motor 1304 controls the valve position of the rotary control valve using a command signal from the PLC. The other elements shown in FIG. 5 may be similar to the elements shown in FIG. 2.

In the embodiment shown in FIG. 5, the servomotor operation of the rotary control valve is in reverse of the operation described in the system of FIG. 2. The rotary control valve is moved toward to fully opened position to allow more fuel to flow in path 1308, which in turn speeds up the turbine. The rotary control valve is moved toward the fully closed position to allow less fuel to flow in path 1308 which, in turn, slows down the turbine.

A detailed description of the many subroutines, in ladder network form, which are executed by the PLC, shown in FIG. 2 and FIG. 5, is provided in the Appendix, which is incorporated herein for its teachings in their entirety.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

APPENDIX

Figure 10:
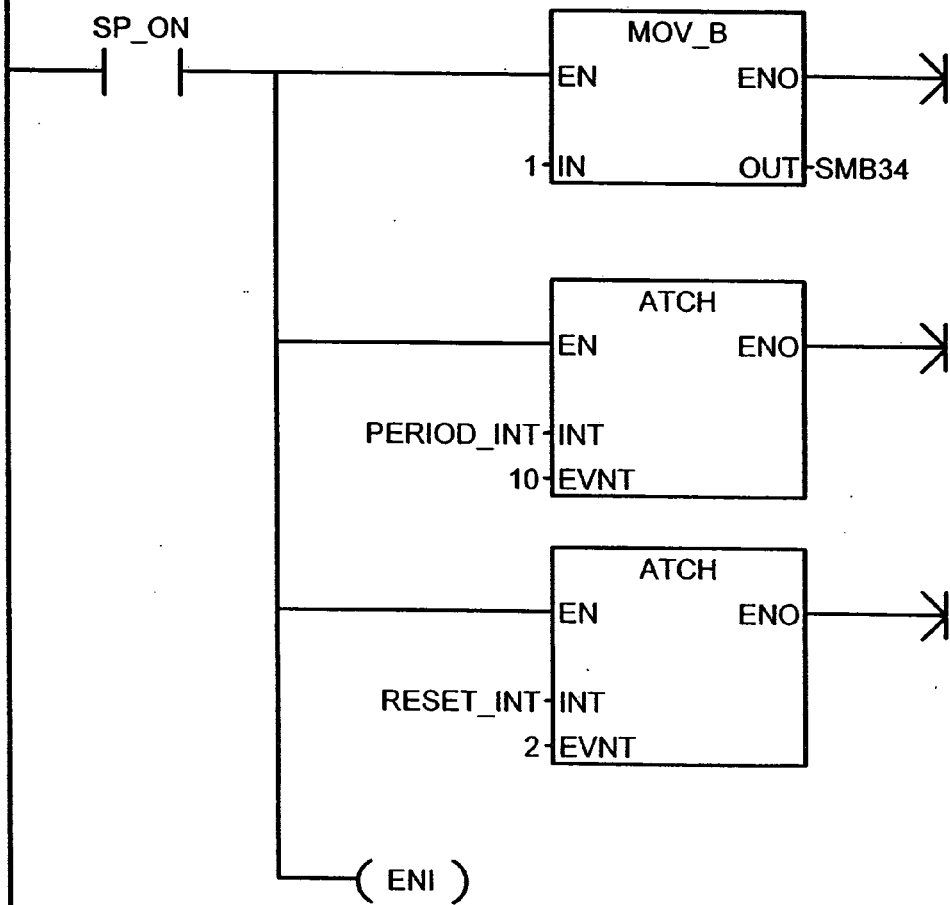
Figure 12:
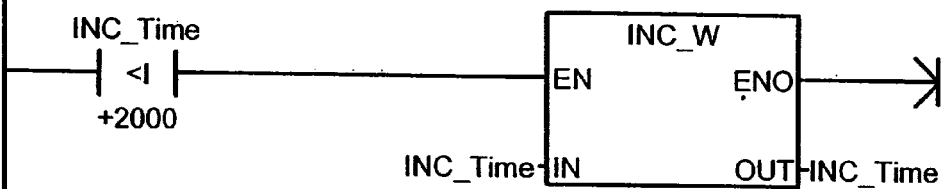
Figure 13:
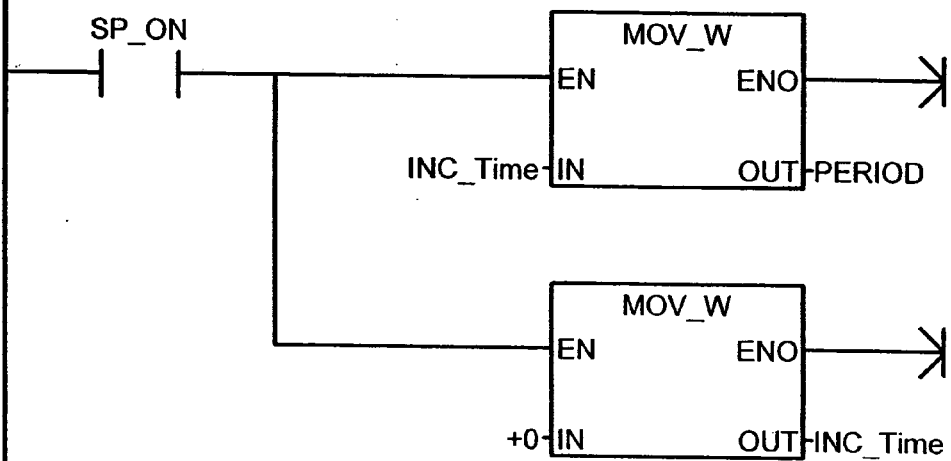

This Appendix includes a description of the subroutines, in ladder network form, which are executed by the PLC in the system of FIG. 2. The subroutines are described, as shown, in the following figures:

FIGS. 6A-6E depict logic flow diagrams, in ladder network form, as executed by the main routine of the PLC of FIG. 2;

FIGS. 7A-7D depict logic flow diagrams, in ladder network form, as executed by the PID subroutine of the PLC of FIG. 2;

FIGS. 8A-8F are logic flow diagrams, in ladder network form, showing the speed subroutine, as executed by the PLC in the system of FIG. 2, in accordance with an embodiment of the invention;

FIGS. 9A-9H are logic flow diagrams, in ladder network form, of the home subroutine, as executed by the PLC in the system of FIG. 2, in accordance with an embodiment of the invention;

FIG. 10 is a logic flow diagram, in ladder network form, showing the period subroutine, as executed by the PLC in the system of FIG. 2, in accordance with an embodiment of the invention;

FIGS. 11A-11E are logic flow diagrams, in ladder network form, of the PID interrupt, as executed by the PLC in the system of FIG. 2, in accordance with an embodiment of the invention;

FIG. 12 is a logic flow diagram, in ladder network form, of the period interrupt, as executed by the PLC in the system of FIG. 2, in accordance with an embodiment of the invention; and FIG. 13 is a logic flow diagram, in ladder network form, of the reset interrupt, as executed by the PLC in the system of FIG. 2, in accordance with an embodiment of the invention.

The algorithms executed by PLC 52 will now be discussed by reference to the above figures. The algorithms are shown in ladder flow diagrams. In general, the ladder logic flows sequentially from the top of each page to the bottom of each page.

Referring first to FIGS. 6A-6E, a ladder flow diagram of the main routine is shown. The main routine starts the servo drive homing routine. The main routine also loads the PID subroutine, after the homing subroutine is completed. When the RPM_IN is above 900, the Alt_Field (alternator field is enabled). After the homing subroutine is completed, the speed subroutine and the period subroutine are loaded and executed.

Figure 6C:
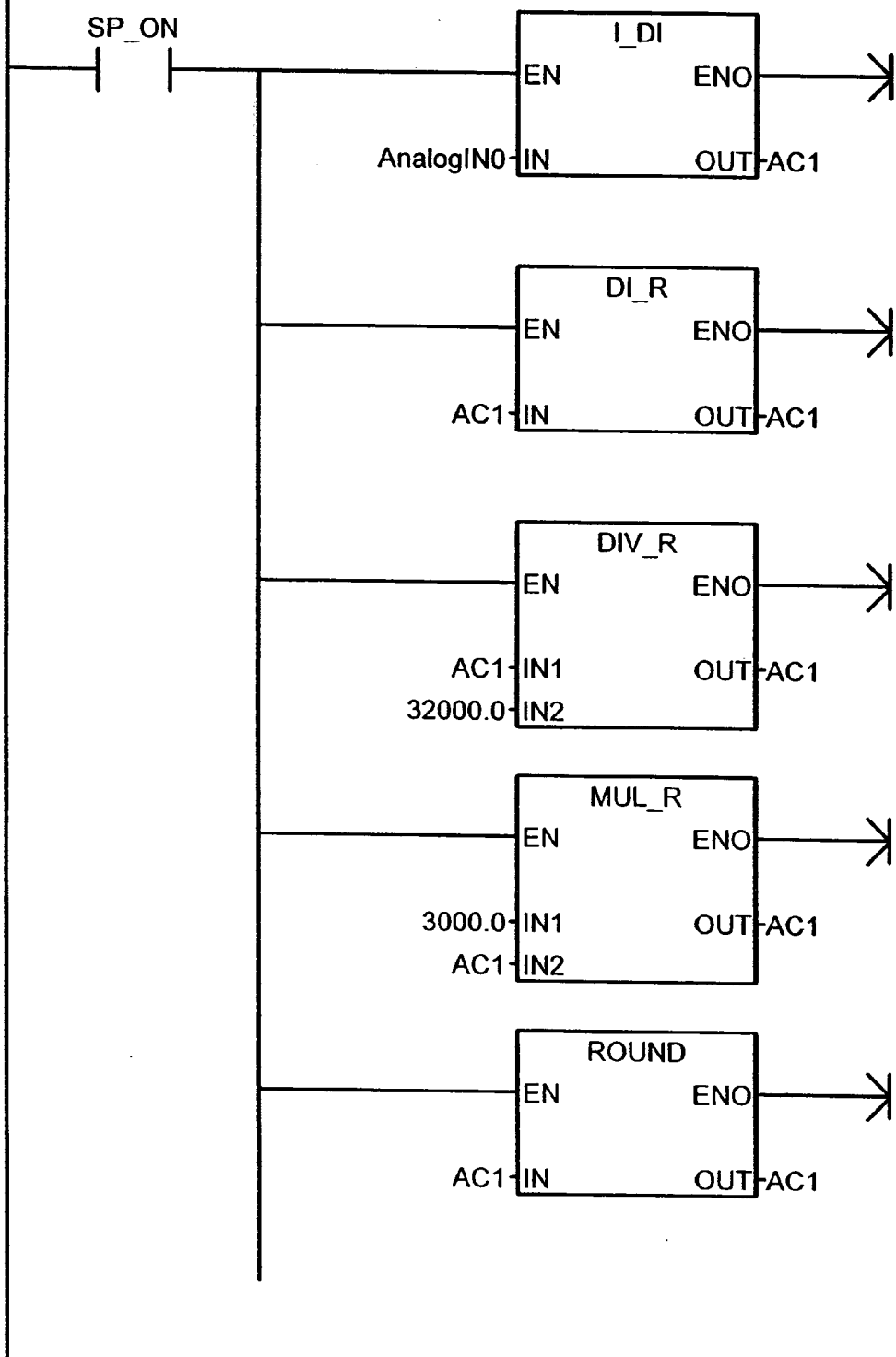
Figure 6D:
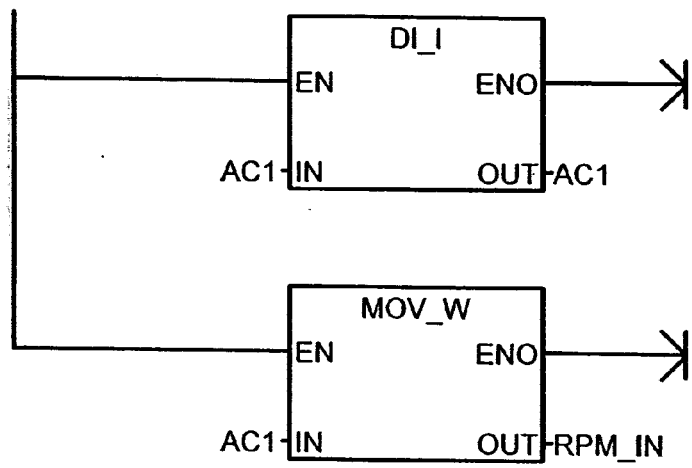

As shown at ladder network 6 of FIG. 6C, the analog input signal is converted to engineering units and stored in a specific memory location. Beginning with a starting value for the analog input signal, the value is accumulated, then divided by 32,000, and next multiplied by 3000. After being rounded and formatted into a digital signal (double integer), the signal is output as the RPM_IN signal (FIG. 6D). The RPM_IN signal is the process variable (PV) signal and ranges between 0 and 3000 RPM.

Figure 6E:
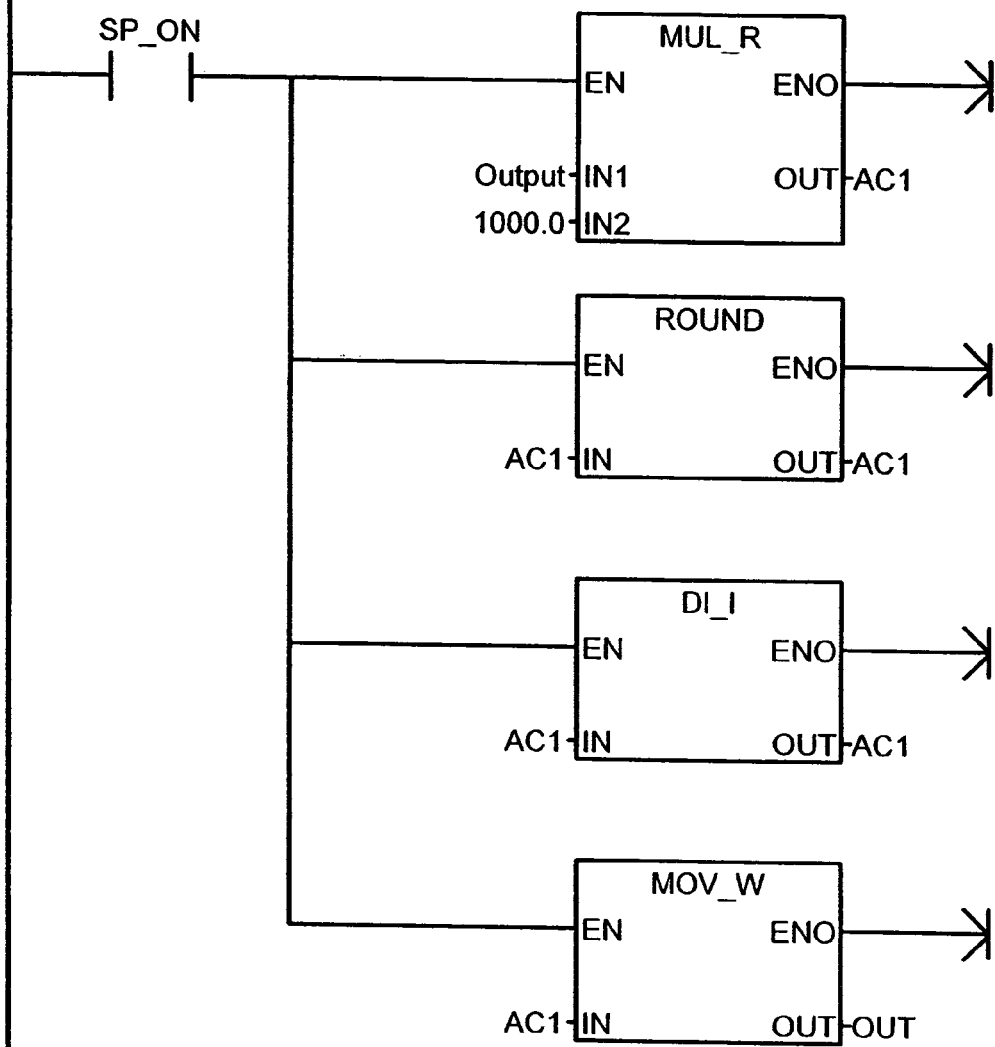
Figure 7B:
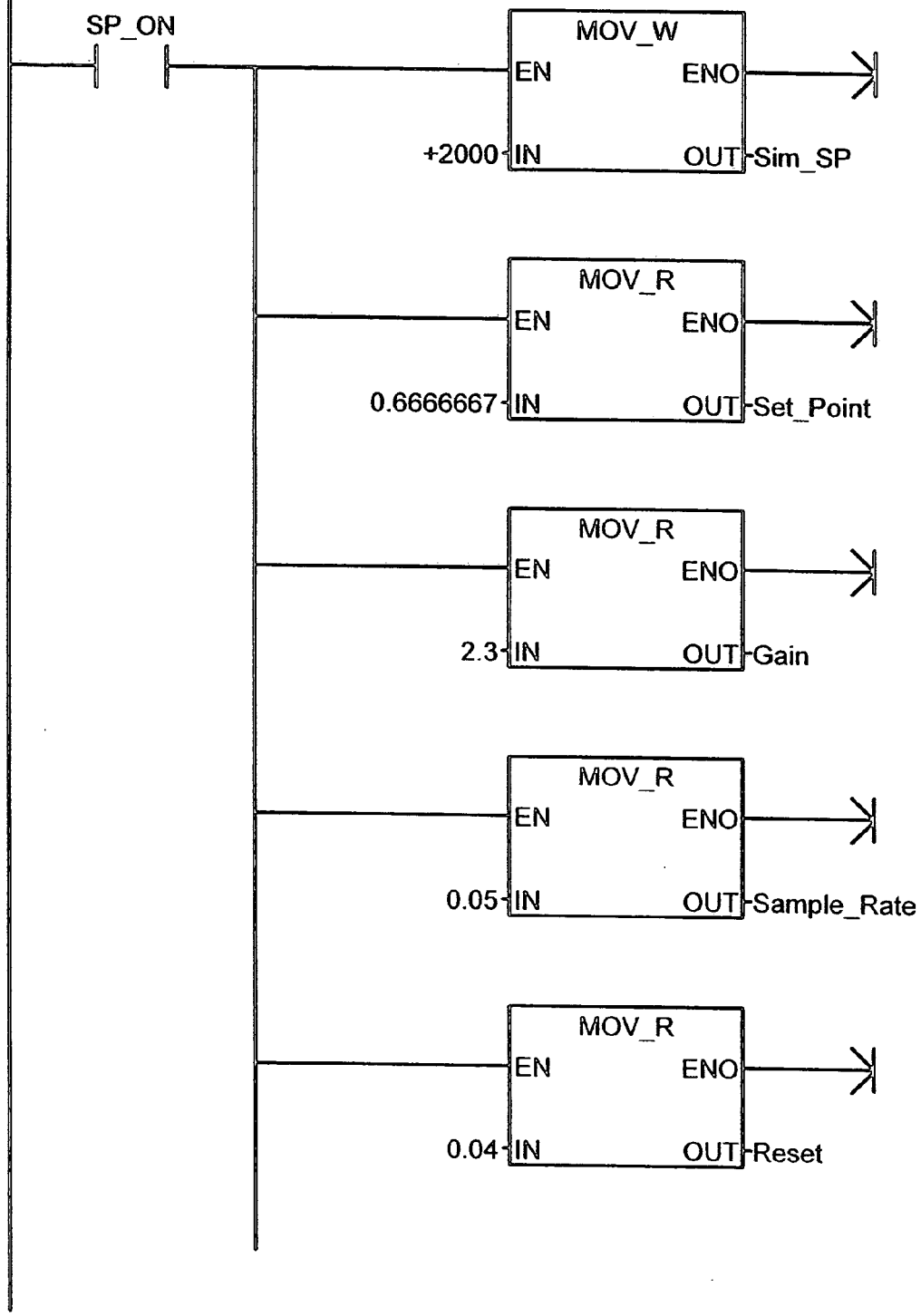
Figure 7C:
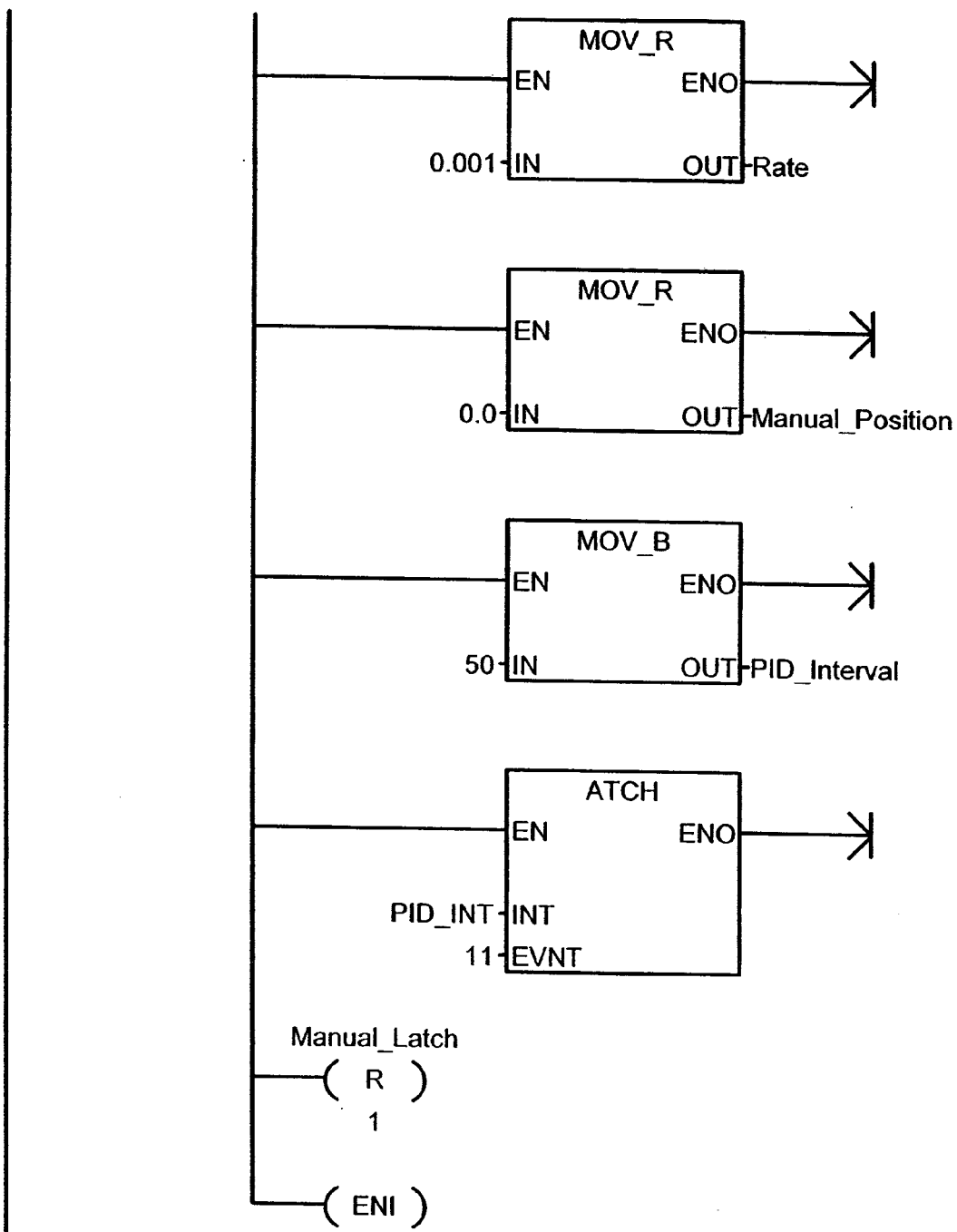

As shown at ladder network 7 of FIG. 6E, the PID output signal is converted into engineering units. The signal is multiplied by a 1000, accumulated and reformatted into a digital format (double interger). The signal is then provided as an output signal, which varies between 0 and 1.0. These values correspond to a valve position between 0% and 100% (completely open (0 position) to completely closed (1.0 position)).

Referring next to FIGS. 7A-7D, the PID subroutine is shown in ladder network form. As shown, all the values for the PID subroutine are loaded and the timed interrupt is set. A setpoint of 2000 RPM, or the corresponding value of 0.6666667 is provided as the setpoint. The gain for the proportion control loop is set to a 2.3 value. The sample rate is set to 50 milliseconds. The integral is set to a period of 0.04 minutes. The derivative portion of the control loop is set to 0.001. The manual position is set to zero. The PID interval is set to 50 milliseconds.

The PID subroutine, called by the main routine (FIG. 6A), is shown in ladder network format in FIGS. 7A-7D. The values for the PID and the timed interrupt are loaded by network 1.

The speed subroutine, called by the main routine (FIG. 6B), is shown in ladder network format in FIGS. 8A-8F. Network 1 provides the no-speed flag, whereas network 2 provides the running flag to indicate that the turbine should be turning. Network 3 sets the NO_RPM flag, if the running flag is ON and the deadman input is ON and [the RPM_IN is less than 100] or [the NO_SPEED flag is ON].

Network 4 in FIG. 8B sets the high_high flag, if the RPM_IN is greater than or equal to 2500. This indicates that the turbine speed is excessive. RPM_IN may vary between 0-3000 RPM (process variable (PV) input).

Network 5 in FIG. 8C sets the deadman output flag, if the deadman input is ON, and the LCR flag is on from the meter and the high_high flag is OFF, and the ready-in from the servomotor is ON, and the NO_RPM flag is OFF.

Network 6 in FIG. 8C sets the dead off flag on when the deadman is released and holds it on, until the dead off delay timer becomes true.

Figure 8D:

Network 7 in FIG. 8D is a 5 sec. delay used in the above network.

Figure 8E:
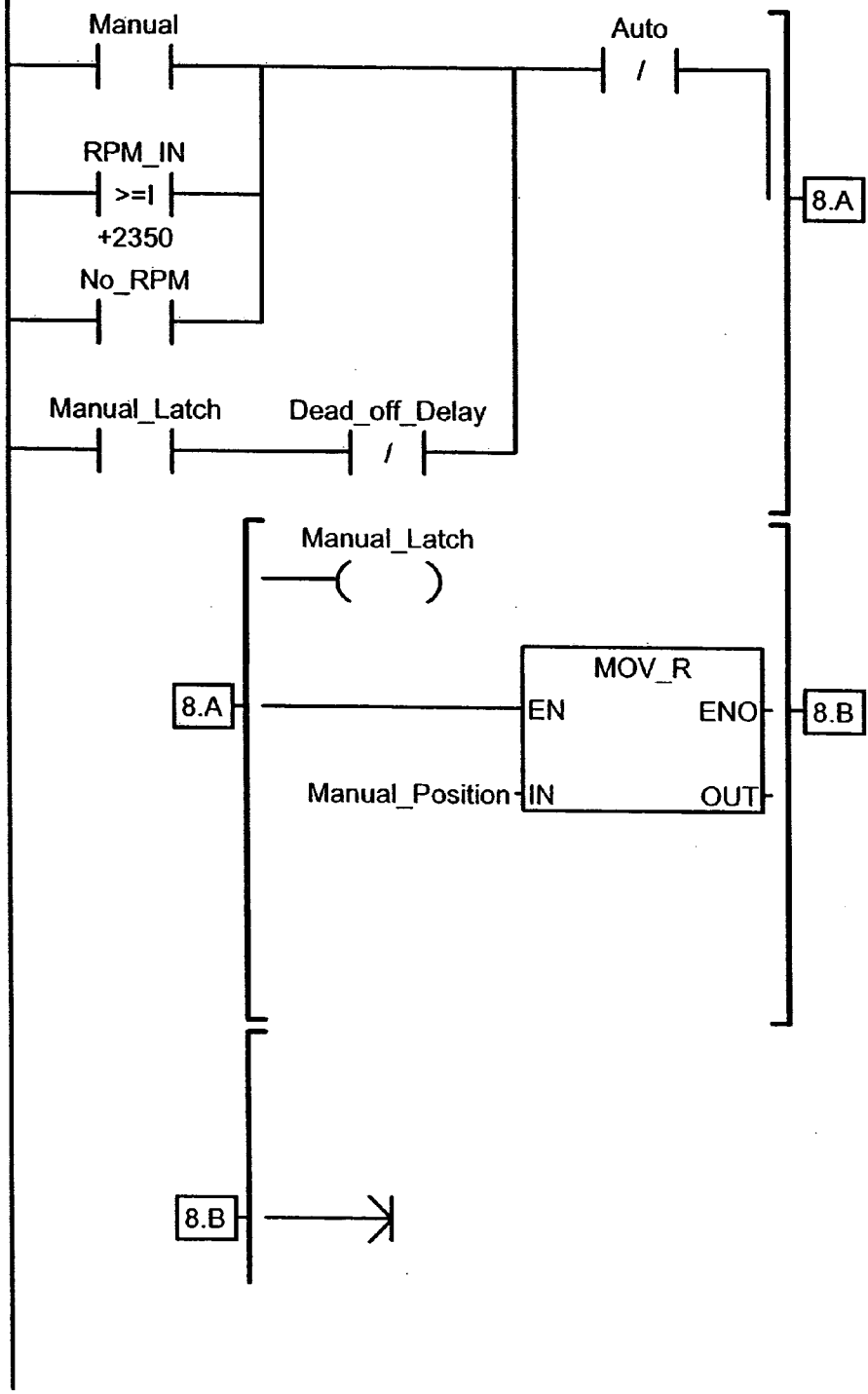
Figure 9C:
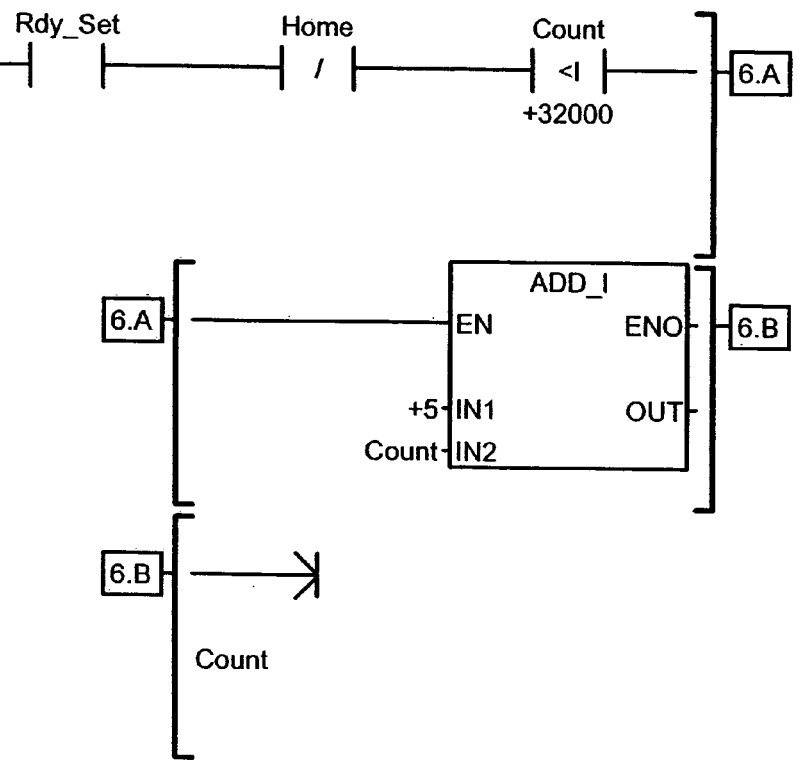

Network 8 in FIG. 8E places the PID into a manual mode, if certain conditions are met. This also moves valve 32 to the full open position. The PID is placed into manual mode, if the [Manual input to the PLC is activated, or the RPM_IN is greater than or equal to 2350 or the NO_RPM flag is on] and the Auto switch is off.

Network 9 in FIG. 8F moves the position to place the valve into the Manual_Position slot.

The home subroutine, called by the main routine (FIG. 6A), is shown in ladder network format in FIGS. 9A-9H. As shown, on the first scan, network 1 loads the value of 0 into the counter. When the start_homing switch is ON, network 2 starts a timer that activates the start_timer flag, after 1 second interval. After the start_timer flag is ON, network 3 enables the drive command flag.

After the drive command flag is enabled, network 4 starts a 2 second timer, in order to wait 2 seconds to receive the ready command from the servo drive (54 in FIG. 2). After 2 seconds, network 5 sets the ready_set flag, if the ready_timer is ON, and the ready-in flag is ON.

If the ready_set flag is ON, and the servomotor is not home and the count is less than 32,000, network 6 increments a counter by a value of 5, until it gets to 32,000. It will be appreciated that the counter counts between 0 and 32,000, which corresponds to an analog value between 0 volts and 10 volts, respectively.

When the torque input from servo drive 54 (FIG. 2) reaches a set value (for example 2250), network 7 sets the home flag. When the servo drive is home, network 8 loads the measured position (input to servo drive 54) and sets the counter to zero. (This is done in Network 14).

Network 9 provides the inhibit_drive flag to inhibit the servo drive, if Home is on, until the Torque_Inhibit timer comes on.

Network 10, shown in FIG. 9E, provides the hold_valve flag which sends a command to the rotary control valve, by way of the servo drive and the servomotor, to completely open the valve, and hold the valve open until the timer counts to seven seconds.

Network 11 keeps the load measured position, which is output to the servo drive, ON for 1 second. Network 12 provides the torque inhibit timer for 2 sec. to the servo drive, when the inhibit_drive flag is ON. Network 13 provides the open_delay timer for 7 sec., when the hold_valve flag is ON. Network 14 and network 15 provide a count value for the home position, and move the count value to the analog output. Network 16 sets the home_complete flag, when the valve has been opened for the set delay period.

The period subroutine, called by the main routine (FIG. 6B), is shown in FIG. 10. The period subroutine is activated, after the home subroutine is completed (see network 4 in FIG. 6B). The period subroutine includes a period interrupt (see FIG. 12) and a reset interrupt (see FIG. 13). The period subroutine is a period counting routine.

The PID interrupt routine is shown in FIGS. 11A-11E. Network 1 converts the analog input into a real number, varying between 0.0 and 1.0. This real number corresponds to the process variable (PV). Network 2 loads the setpoint and converts the setpoint to a value between 0.0 and 1.0. The setpoint may take on a value between 0 RPM and 3000 RPM.

Network 3 calls the PID function, if the manual latch is OFF.

Figure 11B:
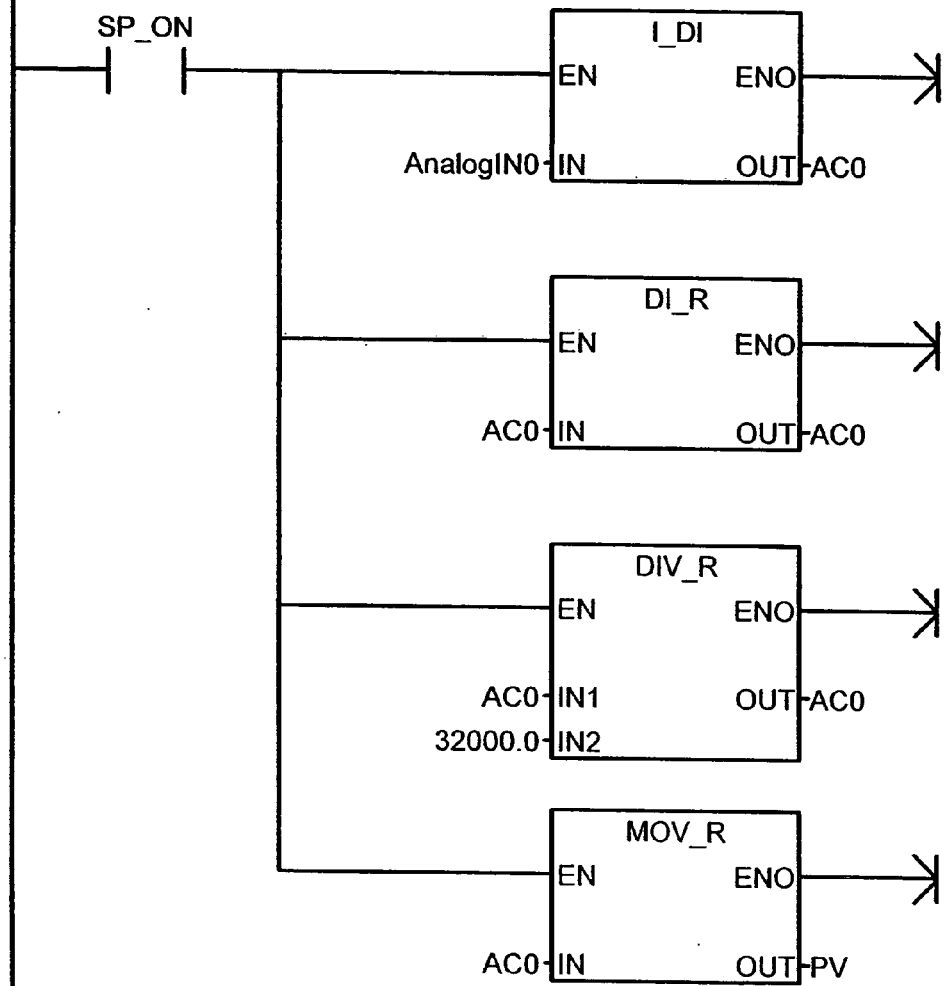
Figure 11C:
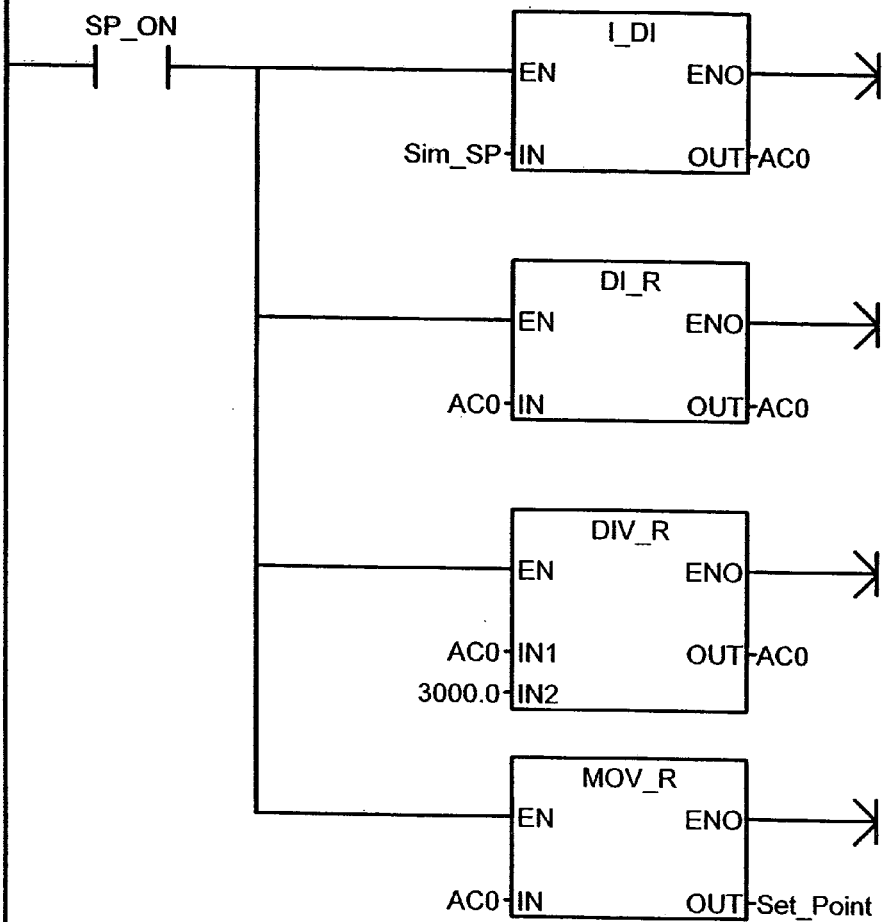
Figure 11D:
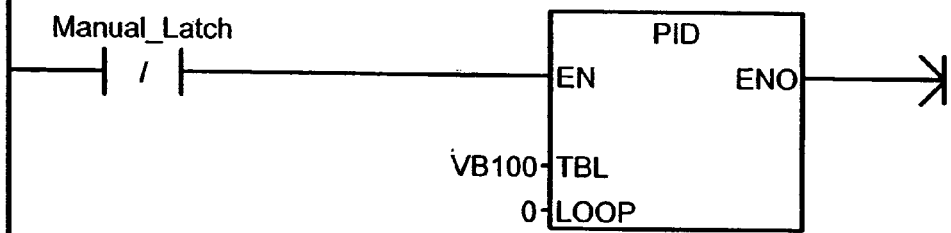
Figure 11E:
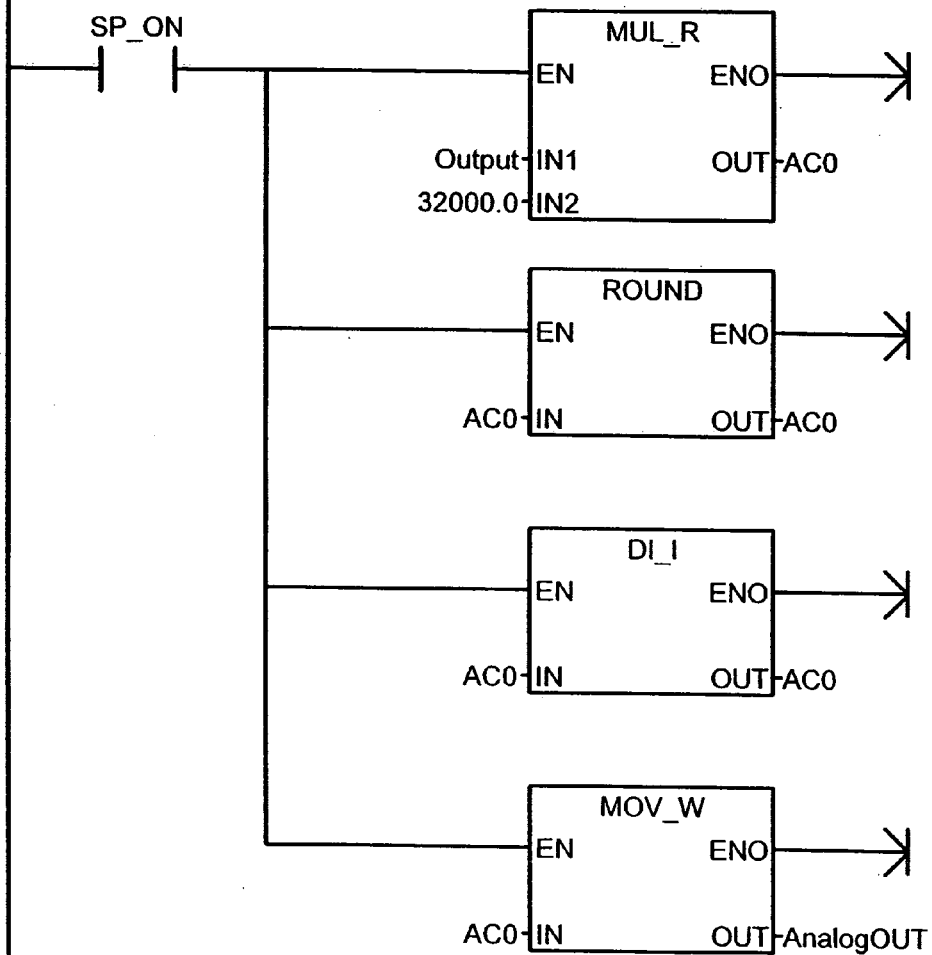

Network 4 shown in FIG. 11E, provides the PID output as a value between 0.0 and 1.0. This value is converted to a corresponding value between 0 RPM and 3000 RPM, and then output as the analog output to servo drive 54 (FIG. 2).

Completing the description of the PLC ladder network, the following table summarizes the input and output signals to and from the routines and subroutines of the ladder network. Signals 1-10 and 27-30 are input/output signals to/from PLC 52 (FIG. 2). The other signals are input/output signals within the PLC provided between the various ladder networks.

Table of Input/Output Signals of the PLC Ladder Network

| | | Symbol | Address | Comment: |
|---|---|---|---|---|
| 1 | | Alt_Field | Q0.4 | Alternator field enable |
| 2 | | AnalogIN0 | AIW0 | RPM input |
| 3 | | TQ_IN | AIW2 | Torque Input |
| 4 | | AnalogOUT | AQW0 | Analog OUT |
| 5 | ⦿ | Sec_RPM | I0.1 | Secondary RPM |
| 6 | | DeadIn | I0.2 | Deadman Input |
| 7 | | RdyIN | I0.3 | Ready from Drive |
| 8 | | LCR | I0.4 | LCR2 Enable Input |
| 9 | | Manual | I0.6 | Manual Switch |
| 10 | | Auto | I0.7 | PID automatic switch |
| 11 | | NO_SPEED | M0.0 | On If There Is No Speed Input |
| 12 | | Manual_Latch | M0.1 | Latch for Manual override |
| 13 | | No_RPM | M0.2 | No RPM |
| 14 | | High_High | M0.3 | Way Overspeed |
| 15 | not used ⦿ | Ovrspd | M0.4 | Overspeed |
| 16 | not used ⦿ | DIP | M0.5 | RPM Drops below setpoint |
| 17 | not used ⦿ | Spool | M0.6 | Spool up Command |
| 18 | not used ⦿ | Spool_1 | M1.0 | Spool 1 |
| 19 | not used ⦿ | Spool_2 | M1.1 | Spool 2 |
| 20 | not used ⦿ | Spool_3 | M1.2 | Spool 3 |
| 21 | not used ⦿ | Spool_4 | M1.3 | Spool 4 |
| 22 | | Rdy_Set | M2.0 | Ready Set |
| 23 | | Home | M2.1 | Home Position |
| 24 | | Home_complete | M2.2 | Homing Routine is Complete |
| 25 | | Hold_Valve | M2.3 | Open valve and hold it |
| 26 | | Deadoff | M3.0 | Deadman off delay |
| 27 | | DeadOut | Q0.0 | Deadman Output |
| 28 | | Enable_Dry | Q0.1 | Enable Drive Command |
| 29 | | Load_Meas_Pos | Q0.2 | Load Measured Position |
| 30 | | Inhibit_Drive | Q0.3 | Output to inhibit drive |
| 31 | | SP_ON | SM0.0 | Special Memory Always ON |
| 32 | | First_Scan | SM0.1 | Special Memory First Scan |
| 33 | | PID_Interval | SMB35 | PID Timed Interval |
| 34 | | Running | T37 | Process is running and Turbine should be turning |
| 35 | not used ⦿ | spool1_tmr | T38 | Spool up setpoint 1 timer |
| 36 | not used ⦿ | spool2_tmr | T39 | Spool up setpoint 2 timer |
| 37 | not used ⦿ | spool3_tmr | T40 | Spool up setpoint 3 timer |
| 38 | not used ⦿ | spool4_tmr | T41 | Spool up setpoint 4 timer (final) |
| 39 | | Start_TMR | T42 | Start up delay |
| 40 | | Ready_TMR | T43 | Ready Timer Delay |
| 41 | | Load_Pos_TMR | T44 | Load Measured Position Timer |
| 42 | | Torque_Inhibit | T45 | Positive and Negative Torque Inhibit |
| 43 | | Open_Delay | T46 | Open Delay |
| 44 | | Dead_off_Delay | T47 | Deadman off delay timer |
| 45 | | PV | VD100 | Process Variable |
| 46 | | Set_Point | VD104 | PID Set Point |
| 47 | | Output | VD108 | PID Output (0-1.0) |
| 48 | | Gain | VD112 | PID Loop Gain |
| 49 | | Sample_Rate | VD116 | PID Loop Sample Rate |
| 50 | | Reset | VD120 | PID Integral Gain (MIN) |
| 51 | | Rate | VD124 | PID Derivative Gain (MIN) |
| 52 | ⦿ | Bias | VD128 | Pid Bias |
| 53 | ⦿ | Prev_PV | VD132 | PID Previous PV |
| 54 | | Manual_Position | VD136 | Manual Position |
| 55 | | RPM_IN | VW200 | PV IN (0-3000 RPM) |
| 56 | | OUT | VW202 | Valve Position (0%-100.0%) |
| 57 | | Sim_SP | VW204 | Simulated Set Point (0-3000) |
| 58 | | INC_Time | VW300 | Incremental Time (ms) |
| 59 | | PERIOD | VW302 | Period (ms) |
| 60 | | Count | VW400 | Incremental Count for Home Position |
| 61 | | | | |
| 62 | | | | |
| 63 | | | | |
| 64 | | | | |
| 65 | | | | |
| 66 | | | | |
| 67 | | | | |
| 68 | | | | |
| 69 | | | | |
| 70 | | | | |

FIG. 6A

Block: MAIN
Author:
Created: 01/14/2004 05:42:07 pm
Last Modified: 03/22/2005 09:27:02 am Rampcharger Control PLC

Network 1

Start Servo Drive Homing Routine

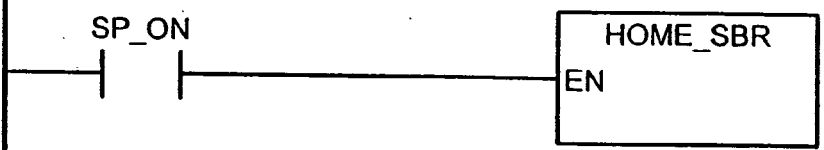

| Symbol | Address | Comment |
|---|---|---|
| SP_ON | SM0.0 | Special Memory Always ON |

Network 2

Load the PID sub rutine

| Symbol | Address | Comment |
|---|---|---|
| Home_complete | M2.2 | Homing Routine is Complete |

Network 3

When the Turbine begins to turn, activate the alternator field

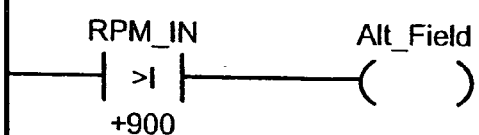

| Symbol | Address | Comment |
|---|---|---|
| Alt_Field | Q0.4 | Alternator field enable |
| RPM_IN | VW200 | PV IN (0-3000 RPM) | rampcharger rev1.01 / MAIN (OB1)                FIG. 6B
Network 4
When the Homing routine is complete, allow the period counting routine to begin
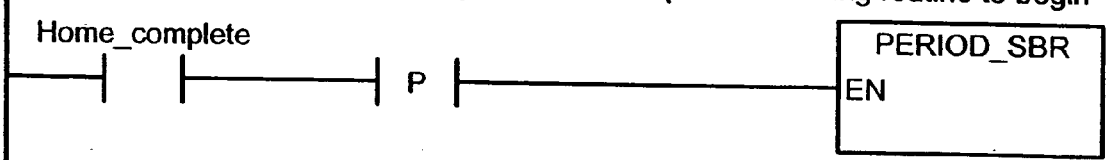
| Symbol | Address | Comment |
|---|---|---|
| Home_complete | M2.2 | Homing Routine is Complete |
Network 5
When the Homing routine is complete, allow the speed subroutine to begin
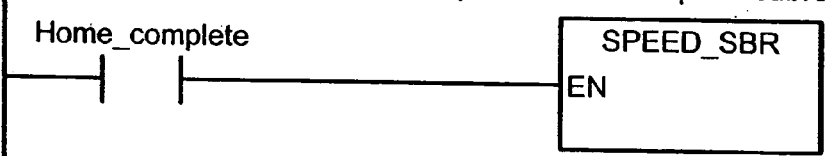
| Symbol | Address | Comment |
|---|---|---|
| Home_complete | M2.2 | Homing Routine is Complete | rampcharger rev1.01 / MAIN (OB1)

| Symbol | Address | Comment |
|---|---|---|
| AnalogIN0 | AIW0 | RPM input |
| RPM_IN | VW200 | PV IN (0-3000 RPM) |
| SP_ON | SM0.0 | Special Memory Always ON |

Network 7

Convert the PID OUT to engineering units

| Symbol | Address | Comment |
|---|---|---|
| OUT | VW202 | Valve Position (0%-100.0%) |
| Output | VD108 | PID Output (0-1.0) |
| SP_ON | SM0.0 | Special Memory Always ON |

Block: PID_SBR
Author:
Created: 01/14/2004 05:42:07 pm
Last Modified: 04/06/2004 02:38:14 pm

FIG. 7A rampcharger rev1.01 / PID_SBR (SBR0)

| Symbol | Address | Comment |
|---|---|---|
| Gain | VD112 | PID Loop Gain |
| Manual_Latch | M0.1 | Latch for Manual override |
| Manual_Position | VD136 | Manual Position | rampcharger rev1.01 / PID_SBR (SBR0)

FIG. 7D

| PID_INT | INT0 | PID interrupt |
| PID_Interval | SMB35 | PID Timed Interval |
| Rate | VD124 | PID Derivative Gain (MIN) |
| Reset | VD120 | PID Integral Gain (MIN) |
| Sample_Rate | VD116 | PID Loop Sample Rate |
| Set_Point | VD104 | PID Set Point |
| Sim_SP | VW204 | Simulated Set Point (0-3000) |
| SP_ON | SM0.0 | Special Memory Always ON | rampcharger rev1.01 / SPEED_SBR (SBR1)

Block: SPEED_SBR
Author:
Created: 01/28/2004 09:17:00 am
Last Modified: 04/22/2004 06:16:35 pm

FIG. 8A

Speed Counting

Network 1

If the incrimental time equals 2 seconds, set the no-speed

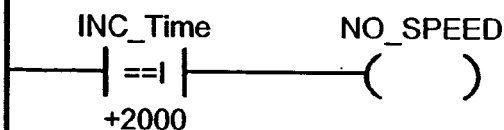

| Symbol | Address | Comment |
|---|---|---|
| INC_Time | VW300 | Incrimental Time (ms) |
| NO_SPEED | M0.0 | On If There Is No Speed Input |

Network 2

If the incrimental timer is less than 2 seconds, start the running timer

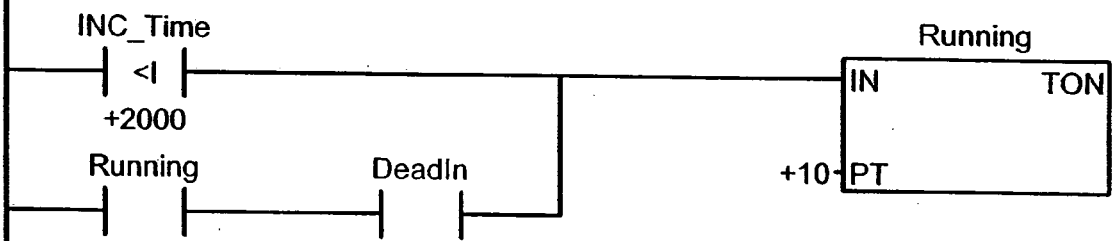

| Symbol | Address | Comment |
|---|---|---|
| DeadIn | I0.2 | Deadman Input |
| INC_Time | VW300 | Incrimental Time (ms) |
| Running | T37 | Process is running and Turbine should be turning | rampcharger rev1.01 / SPEED_SBR (SBR1)     FIG. 8B

Network 3

If the process is running and the deadman input is activated and the rpm input is less than 100 or there is no speed then set no rpm

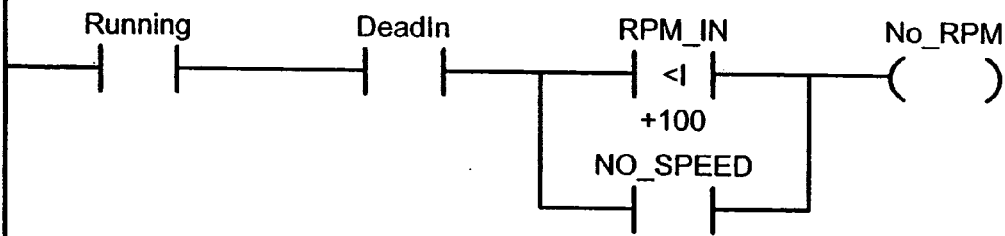

| Symbol | Address | Comment |
|---|---|---|
| DeadIn | I0.2 | Deadman Input |
| No_RPM | M0.2 | No RPM |
| NO_SPEED | M0.0 | On If There Is No Speed Input |
| RPM_IN | VW200 | PV IN (0-3000 RPM) |
| Running | T37 | Process is running and Turbine should be turning |

Network 4

If the rpm input is greater or equal to 2500 then set a high high setting

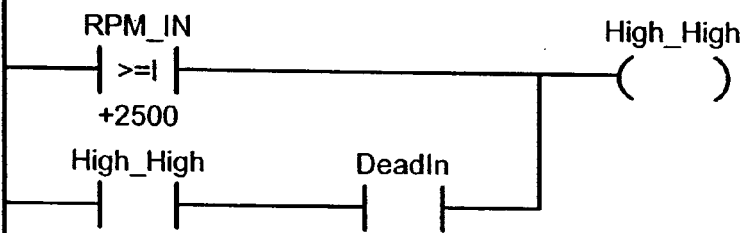

| Symbol | Address | Comment |
|---|---|---|
| DeadIn | I0.2 | Deadman Input |
| High_High | M0.3 | Way Overspeed |
| RPM_IN | VW200 | PV IN (0-3000 RPM) | rampcharger rev1.01 / SPEED_SBR (SBR1)   FIG. 8C

Network 5 if the deadman input is activated, and the LCR input is set, and the high high setting is not set and the ready input from the servo drive is set, then set the deadman output on

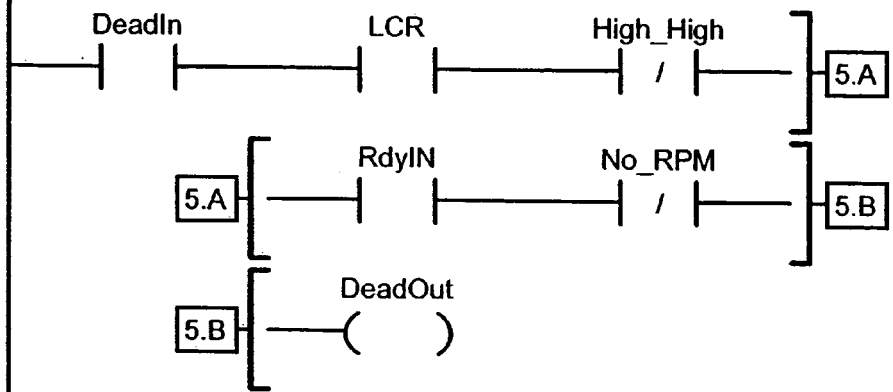

| Symbol | Address | Comment |
|---|---|---|
| DeadIn | I0.2 | Deadman Input |
| DeadOut | Q0.0 | Deadman Output |
| High_High | M0.3 | Way Overspeed |
| LCR | I0.4 | LCR2 Enable Input |
| No_RPM | M0.2 | No RPM |
| RdyIN | I0.3 | Ready from Drive |

Network 6

Turns the deadoff flag on when the deadman is released and holds it on until the dead off delay timer becomes true

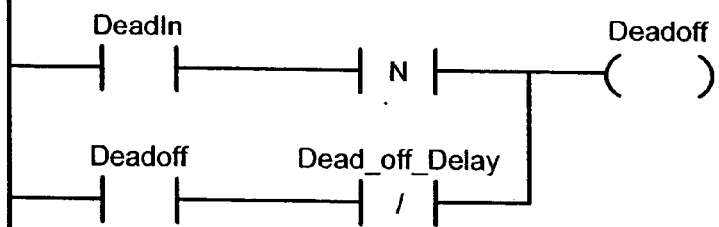

| Symbol | Address | Comment |
|---|---|---|
| Dead_off_Delay | T47 | Deadman off delay timer |
| DeadIn | I0.2 | Deadman Input |
| Deadoff | M3.0 | Deadman off delay |

Network 7
When the deadoff flag is true, the 5 sec. timer is turned on.

| Symbol | Address | Comment |
|---|---|---|
| Dead_off_Delay | T47 | Deadman off delay timer |
| Deadoff | M3.0 | Deadman off delay |

Output

FIG. 8F

| Symbol | Address | Comment |
|---|---|---|
| Auto | I0.7 | PID automatic switch |
| Dead_off_Delay | T47 | Deadman off delay timer |
| Manual | I0.6 | Manual Switch |
| Manual_Latch | M0.1 | Latch for Manual override |
| Manual_Position | VD136 | Manual Position |
| No_RPM | M0.2 | No RPM |
| Output | VD108 | PID Output (0-1.0) |
| RPM_IN | VW200 | PV IN (0-3000 RPM) |

Network 9

If the manual latch is not on, put the PID into automatic mode

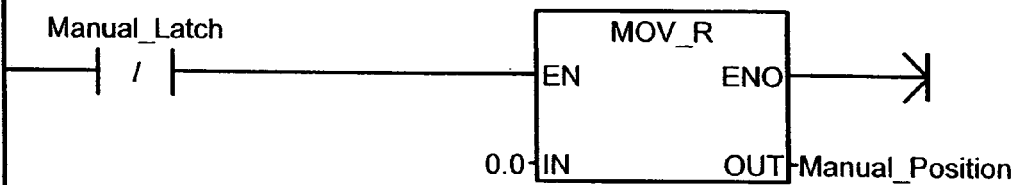

| Symbol | Address | Comment |
|---|---|---|
| Manual_Latch | M0.1 | Latch for Manual override |
| Manual_Position | VD136 | Manual Position | rampcharger rev1.01 / HOME_SBR (SBR2)

Block: HOME_SBR  
Author:  
Created: 03/02/2004 08:29:01 am  
Last Modified: 03/18/2004 03:09:29 pm

FIG. 9A

SUBROUTINE COMMENTS

Network 1   Loads the value 0 into the counter

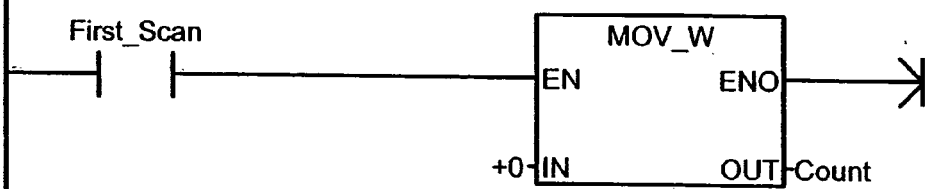

| Symbol | Address | Comment |
|---|---|---|
| Count | VW400 | Incrimental Count for Home Position |
| First_Scan | SM0.1 | Special Memory First Scan |

Network 2   When the Start_Homing switch is on, the start timer will take 1 sec to activate

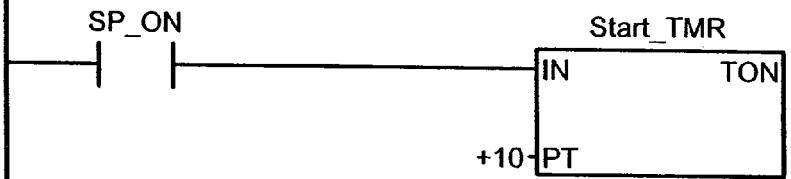

| Symbol | Address | Comment |
|---|---|---|
| SP_ON | SM0.0 | Special Memory Always ON |
| Start_TMR | T42 | Start up delay | rampcharger rev1.01 / HOME_SBR (SBR2)

Network 3  When the start timer turns on, enable the drive   FIG. 9B

| Symbol | Address | Comment |
|---|---|---|
| Enable_Drv | Q0.1 | Enable Drive Command |
| Start_TMR | T42 | Start up delay |

Network 4  When the drive is enabled, wait 2 seconds to receive the ready command from the drive

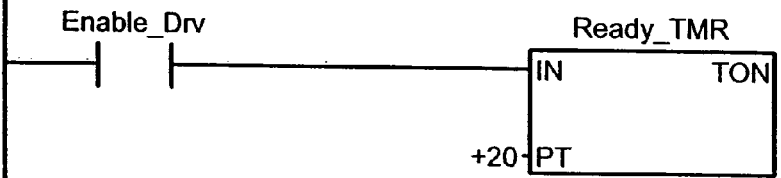

| Symbol | Address | Comment |
|---|---|---|
| Enable_Drv | Q0.1 | Enable Drive Command |
| Ready_TMR | T43 | Ready Timer Delay |

Network 5  After 2 seconds and the ready command has been received, set ready bit

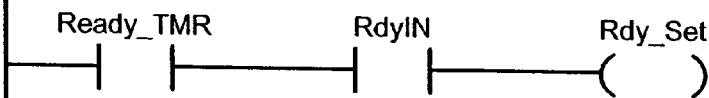

| Symbol | Address | Comment |
|---|---|---|
| Rdy_Set | M2.0 | Ready Set |
| RdyIN | I0.3 | Ready from Drive |
| Ready_TMR | T43 | Ready Timer Delay | rampcharger rev1.01 / HOME_SBR (SBR2)

Network 6  When the ready bit has been set and the drive is not home, incriment the output by 5 until it gets to 3200 then stop incrimenting.

| Symbol | Address | Comment |
|---|---|---|
| Count | VW400 | Incrimental Count for Home Position |
| Home | M2.1 | Home Position |
| Rdy_Set | M2.0 | Ready Set |

FIG. 9D rampcharger rev1.01 / HOME_SBR (SBR2)

Network 7  When the torque input has reached a set value, then set the home bit

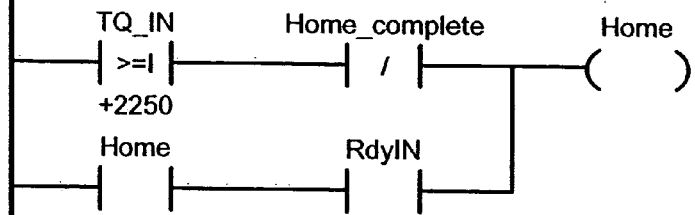

| Symbol | Address | Comment |
|---|---|---|
| Home | M2.1 | Home Position |
| Home_complete | M2.2 | Homing Routine is Complete |
| RdyIN | I0.3 | Ready from Drive |
| TQ_IN | AIW2 | Torque Input |

Network 8  When the drive is home, load the measured position and set the counter to 0

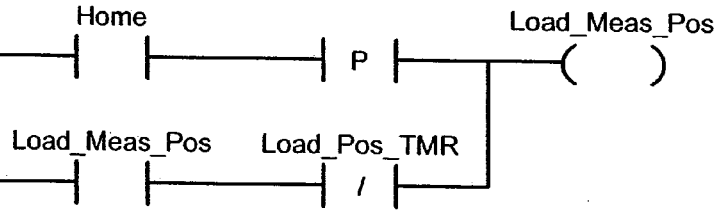

| Symbol | Address | Comment |
|---|---|---|
| Home | M2.1 | Home Position |
| Load_Meas_Pos | Q0.2 | Load Measured Position |
| Load_Pos_TMR | T44 | Load Measured Position Timer | rampcharger rev1.01 / HOME_SBR (SBR2)

Network 9     When the drive is home, inhibit the drive     FIG. 9E

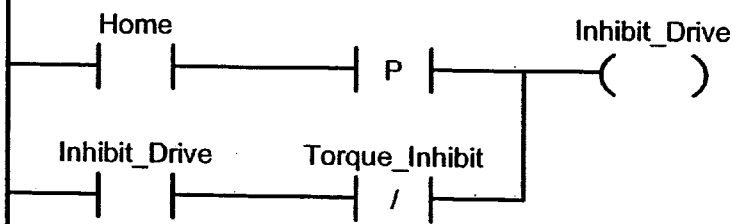

| Symbol | Address | Comment |
|---|---|---|
| Home | M2.1 | Home Position |
| Inhibit_Drive | Q0.3 | Output to inhibit drive |
| Torque_Inhibit | T45 | Positive and Negative Torque Inhibit |

Network 10     When the valve is home, hold the valve open until the delay time expires

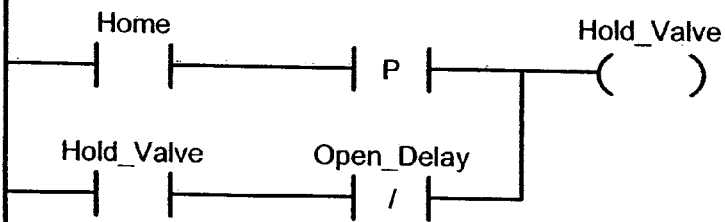

| Symbol | Address | Comment |
|---|---|---|
| Hold_Valve | M2.3 | Open valve and hold it |
| Home | M2.1 | Home Position |
| Open_Delay | T46 | Open Delay | rampcharger rev1.01 / HOME_SBR (SBR2)                           FIG. 9F

Network 11   Keep the Load Measured Position Output on for 1 second

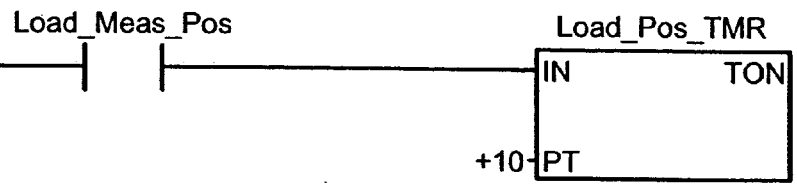

| Symbol | Address | Comment |
|---|---|---|
| Load_Meas_Pos | Q0.2 | Load Measured Position |
| Load_Pos_TMR | T44 | Load Measured Position Timer |

Network 12   When the drive is inhibited, set the torque inhibit timer

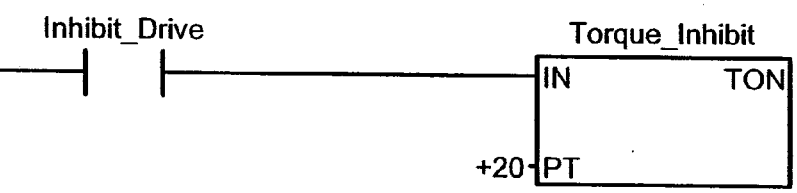

| Symbol | Address | Comment |
|---|---|---|
| Inhibit_Drive | Q0.3 | Output to inhibit drive |
| Torque_Inhibit | T45 | Positive and Negative Torque Inhibit |

FIG. 9G rampcharger rev1.01 / HOME_SBR (SBR2)

Network 13 When the hold valve command is set, start the open delay timer

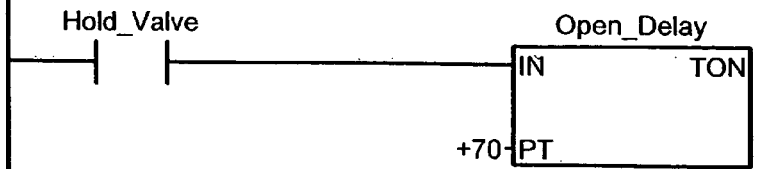

| Symbol | Address | Comment |
|---|---|---|
| Hold_Valve | M2.3 | Open valve and hold it |
| Open_Delay | T46 | Open Delay |

Network 14 when the load measured position timer is set, move the value 0 to the incrimental counter

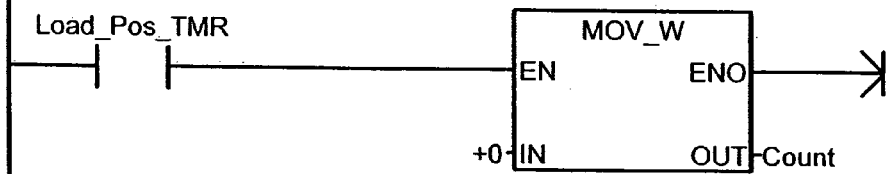

| Symbol | Address | Comment |
|---|---|---|
| Count | VW400 | Incrimental Count for Home Position |
| Load_Pos_TMR | T44 | Load Measured Position Timer | rampcharger rev1.01 / HOME_SBR (SBR2)

FIG. 9H

Network 15   Move the count value to the Analog Output

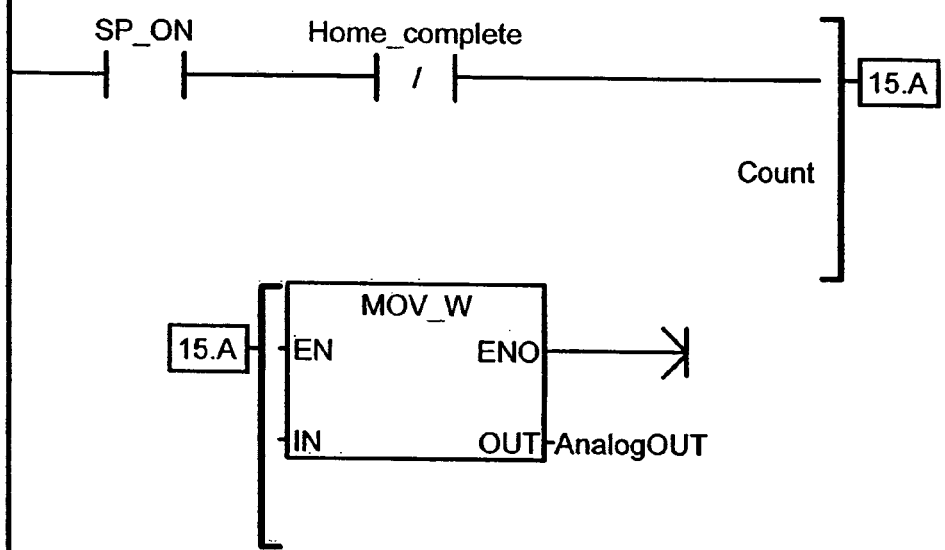

| Symbol | Address | Comment |
|---|---|---|
| AnalogOUT | AQW0 | Analog OUT |
| Count | VW400 | Incrimental Count for Home Position |
| Home_complete | M2.2 | Homing Routine is Complete |
| SP_ON | SM0.0 | Special Memory Always ON |

Network 16   if the open delay is set, set the homing routine complete

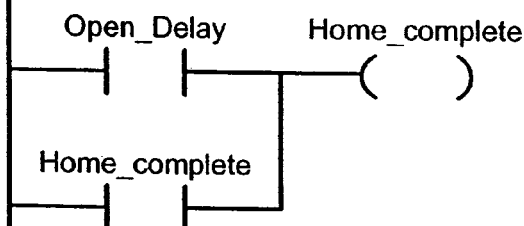

| Symbol | Address | Comment |
|---|---|---|
| Home_complete | M2.2 | Homing Routine is Complete |
| Open_Delay | T46 | Open Delay | rampcharger rev1.01 / PERIOD_SBR (SBR3)

Block: PERIOD_SBR
Author:
Created: 03/02/2004 10:33:47 am
Last Modified: 03/02/2004 12:39:52 pm

SUBROUTINE COMMENTS

Network 1 Network Title

Network Comment

| Symbol | Address | Comment |
|---|---|---|
| PERIOD_INT | INT1 | Incriments time |
| RESET_INT | INT2 | Reset the counter |
| SP_ON | SM0.0 | Special Memory Always ON | rampcharger rev1.01 / PID_INT (INT0)

Block: PID_INT
Author:
Created: 01/14/2004 05:42:07 pm
Last Modified: 03/29/2004 10:49:59 am

FIG. 11A rampcharger rev1.01 / PID_INT (INT0)

PID interrupt

Network 1   PID Interrupt

Convert the Analog IN to a real number from 0.0 - 1.0

| Symbol | Address | Comment |
|---|---|---|
| AnalogIN0 | AIW0 | RPM input |
| PV | VD100 | Process Variable |
| SP_ON | SM0.0 | Special Memory Always ON | rampcharger rev1.01 / PID_INT (INT0)

Network 2

Load a setpoint from VW204 (engineering units) and convert it to a value from 0.0 - 1.0 and store it in VD104

| Symbol | Address | Comment |
|---|---|---|
| Set_Point | VD104 | PID Set Point |
| Sim_SP | VW204 | Simulated Set Point (0-3000) |
| SP_ON | SM0.0 | Special Memory Always ON | rampcharger rev1.01 / PID_INT (INT0)

Network 3
Calls the PID function

| Symbol | Address | Comment |
|---|---|---|
| Manual_Latch | M0.1 | Latch for Manual override | rampcharger rev1.01 / PID_INT (INT0)

Network 4

Converts the PID output from a value 0.0-1.0 to a value 0-32000 and stores it in the analog output

| Symbol | Address | Comment |
|---|---|---|
| AnalogOUT | AQW0 | Analog OUT |
| Output | VD108 | PID Output (0-1.0) |
| SP_ON | SM0.0 | Special Memory Always ON | rampcharger rev1.01 / PERIOD_INT (INT1)

Block: PERIOD_INT
Author:
Created: 01/28/2004 08:51:42 am
Last Modified: 01/28/2004 08:54:02 am Incriments time

Network 1

This incriments the time by one value

| Symbol | Address | Comment |
|---|---|---|
| INC_Time | VW300 | Incrimental Time (ms) | rampcharger rev1.01 / RESET_INT (INT2)

Block: RESET_INT
Author:
Created: 01/28/2004 08:52:27 am
Last Modified: 01/28/2004 08:55:06 am Reset the counter

Network 1

This moves the incrimental time to the period memory location and resets the incrimental time

| Symbol | Address | Comment |
|---|---|---|
| INC_Time | VW300 | Incrimental Time (ms) |
| PERIOD | VW302 | Period (ms) |
| SP_ON | SM0.0 | Special Memory Always ON |

What is claimed is:

1. In a mobile fuel delivery vehicle, providing bulk aircraft fuel from a pressurized fuel reservoir to an aircraft, a method of regulating electrical output of an electrical power source, comprising the steps of:
   (a) receiving, in a first fluid path, the bulk aircraft fuel from the pressurized reservoir;
   (b) controlling flow rate of the bulk aircraft fuel along the first fluid path;
   (c) fluidically rotating a shaft of the electrical power source in a second fluid path, in response to step (b);
   (d) sensing rotation speed of the electrical power source in the second fluid path by measuring number of revolutions per a time period;
   (e) setting a predetermined rotation speed for the electrical power source;
   (f) measuring a difference between the sensed rotation speed of step (d) and the set predetermined rotation speed of step (e); and
   (g) modifying the flow rate of the fuel along the first fluid path based on step (f) and, in turn, the electrical output of the electrical power source;
   wherein modifying the flow rate of the fuel along the first fluid path includes
   placing a valve, separate from the electrical power source, in the first fluid path for controlling the flow rate of the fuel in the first fluid path, and
   electrically operating the valve based on the measured difference between the sensed rotation speed of the electrical power source in the second fluid path and the set predetermined rotation speed.

2. The method of claim 1 wherein
   sensing the rotation speed of the electrical power source includes coupling a speed sensor to the electrical power source, and
   directly sensing the number of revolutions per minute (RPM) of the electrical power source.

3. The method of claim 2 wherein
   coupling the speed sensor to the electrical power source includes attaching the speed sensor to the electrical power source and mounting the electrical power source on the vehicle.

4. The method of claim 1 including the step of:
   supplying the electrical output from the electrical power source to devices requiring electrical input signals in the vehicle.

5. The method of claim 1 including
   dynamically moving the valve at least 5 degrees in less than about 50 milliseconds.

6. The method of claim 1 including
   dynamically moving the valve from a fully opened position to a fully closed position in less than about 1 second.

7. In a mobile fuel delivery vehicle, providing bulk aircraft fuel from a pressurized fuel reservoir to an aircraft, a method of regulating electrical output of an electrical power source, comprising the steps of:
   (a) receiving the bulk aircraft fuel from the pressurized fuel reservoir;
   (b) dividing the bulk aircraft fuel to flow along a primary fluid path and a secondary fluid path;
   (c) controlling flow rate of the fuel along the primary fluid path;
   (d) fluidically rotating a shaft of the electrical power source in the secondary fluid path in response to step (c);
   (e) sensing rotation speed of the electrical power source by measuring number of revolutions per a time period;
   (f) setting a predetermined rotation speed for the electrical power source;
   (g) measuring a difference between the sensed rotation speed of step (e) and the set predetermined rotation speed of step (f); and
   (h) modifying the flow rate of the fuel along the primary fluid path based on step (g) and, in turn, the electrical output of the electrical power source;
   wherein modifying the flow rate of the fuel along the primary fluid path includes
   placing a valve, separate from the electrical power source, in the primary fluid path for controlling the flow rate of the fuel in the primary fluid path, and
   electrically operating the valve based on the measured difference between the sensed rotation speed of the electrical power source in the secondary fluid path and the set predetermined rotation speed.

8. The method of claim 7 wherein
   sensing the rotation speed of the electrical power source includes coupling a speed sensor to the electrical power source, and
   directly sensing the number of revolutions per minute (RPM) of the electrical power source.

9. The method of claim 7 including the step of:
   supplying the electrical output from the electrical power source to devices requiring electrical input signals in the vehicle.

10. The method of claim 7 including
    dynamically moving the valve at least 5 degrees in less than 50 milliseconds.

11. The method of claim 7 including
    dynamically moving the valve from a fully opened position to a fully closed position in less than 1 second.

12. In a mobile fuel delivery vehicle, providing bulk aircraft fuel from a pressurized fuel reservoir to an aircraft, a method of regulating electrical output of an alternator driven by a turbine, the method comprising the steps of:
    (a) receiving the bulk aircraft fuel from the pressurized fuel reservoir;
    (b) dividing the bulk fuel to flow along a primary fluid path and a secondary fluid path;
    (c) controlling flow rate of the fuel along the primary fluid path;
    (d) fluidically rotating a shaft of the turbine in the secondary fluid path in response to step (c);
    (e) sensing rotation speed of the turbine;
    (f) setting a predetermined rotation speed for the turbine;
    (g) measuring a difference between the sensed rotation speed of step (e) and the set predetermined rotation speed of step (f); and
    (h) modifying the flow rate of the fuel along the primary fluid path based on step (g) and, in turn, the electrical output of the alternator;
    wherein modifying the flow rate of the fuel along the primary fluid path includes
    placing a valve, separate from the electrical power source, in the primary fluid path for controlling the flow rate of the fuel in the primary fluid path, and
    electrically operating the valve based on the measured difference between the sensed rotation speed of the electrical power source in the second fluid path and the set predetermined rotation speed.

13. The method of claim 12 wherein controlling the rotation speed of the turbine includes
executing a control loop algorithm in a programmable logic controller (PLC).

14. The method of claim 12 wherein controlling the rotation speed of the turbine includes
controlling rotation speed of the turbine at nearly constant speed, at varying pressures of fuel flowing in the primary fluid path and the secondary fluid path.

15. The method of claim 12 wherein controlling the rotation speed of the turbine includes
controlling rotation speed of the turbine at nearly constant speed, at varying output loads on the alternator driven by the turbine.

16. The method of claim 12 wherein
sensing the rotation speed of the electrical power source includes coupling a speed sensor to the electrical power source, and
directly sensing the number of revolutions per minute (RPM) of the electrical power source.

17. The method of claim 12 including the step of:
supplying the electrical output from the electrical power source to devices requiring electrical input signals in the vehicle.

18. A mobile fuel delivery vehicle, providing bulk aircraft fuel from a pressurized fuel reservoir to an aircraft, comprising
a first fluid path receiving bulk aircraft fuel from the pressurized reservoir,
a valve disposed in a second fluid path for controlling flow rate of the bulk aircraft fuel along the fluid path,
a turbine, for generating regulated electrical power, fluidically coupled to the bulk aircraft fuel in the first fluid path, the turbine separate from the valve,
a rotation speed sensor sensing rotation speed of the turbine by measuring number of revolutions per a time period,
a controller, coupled to the first and second fluid paths and the rotation speed sensor, for controlling a predetermined rotation speed of the turbine,
wherein the controller controls the rotation speed of the turbine by measuring a difference between the sensed rotation speed of the turbine and the predetermined rotation speed of the turbine, and then modifies the flow rate of the fuel along the second fluid path by changing a position of the valve disposed in the first fluid path.

* * * * *